(12) United States Patent
Yamagishi

(10) Patent No.: US 7,272,641 B2
(45) Date of Patent: Sep. 18, 2007

(54) IMAGE INFORMATION MANAGING SYSTEM

(75) Inventor: Yoichi Yamagishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 808 days.

(21) Appl. No.: 10/185,023

(22) Filed: Jun. 28, 2002

(65) Prior Publication Data

US 2003/0009534 A1 Jan. 9, 2003

(30) Foreign Application Priority Data

Jul. 3, 2001 (JP) .............................. 2001-202095

(51) Int. Cl.
G06F 15/16 (2006.01)
(52) U.S. Cl. .................................................... 709/218
(58) Field of Classification Search ........ 709/217–219; 348/14.01–14.02
See application file for complete search history.

(56) References Cited

U.S. PATENT DOCUMENTS

| | | | | |
|---|---|---|---|---|
| 5,760,917 A * | 6/1998 | Sheridan | ...................... | 358/442 |
| 5,930,709 A * | 7/1999 | Park et al. | ................ | 348/211.3 |
| 5,943,603 A * | 8/1999 | Parulski et al. | ............. | 725/133 |
| 6,005,613 A * | 12/1999 | Endsley et al. | .......... | 348/231.6 |
| 6,134,606 A * | 10/2000 | Anderson et al. | ............. | 710/14 |
| 6,167,469 A * | 12/2000 | Safai et al. | ..................... | 710/62 |
| 6,301,607 B2 * | 10/2001 | Barraclough et al. | ....... | 709/204 |
| 6,469,689 B1 * | 10/2002 | Dow et al. | ................... | 345/156 |
| 6,519,596 B1 * | 2/2003 | Hoyt et al. | .................... | 707/10 |
| 6,538,663 B2 * | 3/2003 | Kamei | ........................ | 345/635 |
| 6,567,122 B1 * | 5/2003 | Anderson et al. | .............. | 709/201 |
| 6,571,271 B1 * | 5/2003 | Savitzky et al. | ............. | 709/200 |
| 6,577,336 B2 * | 6/2003 | Safai | ........................ | 348/207.1 |
| 6,583,799 B1 * | 6/2003 | Manolis et al. | ............. | 715/838 |
| 6,611,252 B1 * | 8/2003 | DuFaux | ....................... | 345/168 |
| 6,618,553 B1 * | 9/2003 | Shiohara | ...................... | 386/117 |
| 6,628,899 B1 * | 9/2003 | Kito | ............................. | 396/56 |
| 6,636,259 B1 * | 10/2003 | Anderson et al. | ......... | 348/211.3 |
| 6,642,959 B1 * | 11/2003 | Arai | ......................... | 348/231.3 |
| 6,661,529 B2 * | 12/2003 | Sanbongi et al. | ........... | 358/1.15 |
| 6,678,036 B2 * | 1/2004 | Garfinkle et al. | ............ | 709/219 |
| 6,844,895 B1 * | 1/2005 | Billerbeck et al. | ........ | 348/211.2 |
| 6,867,887 B1 * | 3/2005 | Meyer | ......................... | 358/500 |
| 6,930,709 B1 * | 8/2005 | Creamer et al. | .......... | 348/211.3 |

(Continued)

OTHER PUBLICATIONS

Anatomy of Digital Camera, Sally Wiener Grotta, Extreme Tech, Jun. 12, 2001.*

(Continued)

*Primary Examiner*—Jason Cardone
*Assistant Examiner*—Ajay M Bhatia
(74) *Attorney, Agent, or Firm*—Cowan, Liebowitz & Latman, P.C.

(57) ABSTRACT

An information managing system for browsing or transferring images between apparatuses is connected to a network. In this system, an information storage apparatus such as an image pickup apparatus, an information managing apparatus such as an image server, and an information processing apparatus or client computer such as a PC are interconnected by the network. The information storage apparatus uploads only related information such as an index of image data stored therein to the information managing apparatus to publicize the related information on the network. Only when the information processing apparatus for browsing the public information issues a transmission request for original information, the original information is transmitted from the information storage apparatus to the information processing apparatus.

2 Claims, 17 Drawing Sheets

U.S. PATENT DOCUMENTS

| | | | |
|---|---|---|---|
| 6,940,543 B2 * | 9/2005 | Perotti et al. | 348/211.2 |
| 6,943,909 B2 * | 9/2005 | Goldstein et al. | 358/1.15 |
| 6,957,040 B1 * | 10/2005 | Tanaka | 455/306 |
| 6,965,398 B2 * | 11/2005 | Arakt | 348/211.3 |
| 6,980,232 B2 * | 12/2005 | Suzuki | 348/207.1 |
| 6,995,789 B2 * | 2/2006 | McIntyre et al. | 348/207.1 |
| 6,999,111 B2 * | 2/2006 | McIntyre et al. | 348/207.1 |
| 7,161,701 B2 * | 1/2007 | Ogiwara et al. | 358/1.15 |
| 2001/0008415 A1 * | 7/2001 | Park | 348/143 |
| 2001/0013069 A1 * | 8/2001 | Shah | 709/238 |
| 2001/0013949 A1 * | 8/2001 | Tateyama | 358/1.16 |
| 2001/0016949 A1 * | 8/2001 | Tateyama | 358/1.16 |
| 2001/0019416 A1 * | 9/2001 | Monty et al. | 358/1.9 |
| 2001/0022913 A1 * | 9/2001 | Ohmura | 400/76 |
| 2002/0021903 A1 * | 2/2002 | Ito et al. | 396/429 |
| 2002/0029277 A1 * | 3/2002 | Simpson-Young et al. | 709/228 |
| 2002/0032027 A1 * | 3/2002 | Kirani et al. | 455/426 |
| 2002/0054059 A1 * | 5/2002 | Schneiderman | 345/700 |
| 2002/0176109 A1 * | 11/2002 | Matsumoto | 358/1.15 |
| 2002/0198936 A1 * | 12/2002 | McIntyre et al. | 709/203 |
| 2003/0122932 A1 * | 7/2003 | Shiohara | 348/207.2 |
| 2003/0133015 A1 * | 7/2003 | Jackel et al. | 348/207.1 |
| 2004/0201701 A1 * | 10/2004 | Takagi | 348/207.99 |

OTHER PUBLICATIONS

Wireless camera and site survey issues over an IEEE 802.11b based wireless network test bed, Raghavan S. et al., Local Computer Networks, Nov. 6-8, 2002.*

Smile for the (wireless) camera, Davies R., Communication Engineer, Oct.-Nov. 2004.*

Computergram International, "Toshiba Still Camera Has Modem and Software," Aug. 18, 1995, Dialog.*

Benjamin Creitz, Establishing a 500 Meter Point-to-Point Wireless Link For the Transmission of Remote Camera Data, Jul. 24, 2004.*

Lalya Gaye, Svante Hermansson, Lars Erik Holmquist, BashoCam: collective photographic sequencing in wireless P2P networks, CHI '06 extended abstracts on Human factors in computing systems, 2006, Montréal, Québec, Canada Apr. 22-27, 2006.*

Davide Carboni, Stefano Sanna, Pietro Zanarini, GeoPix: image retrieval on the geo web, from camera click to mouse click, Proceedings of the 8th conference on Human-computer interaction with mobile devices and services, 2006, Helsinki, Finland Sep. 12-15, 2006.*

US 6,583,709, 06/2003, Manolis et al. (withdrawn)*

* cited by examiner

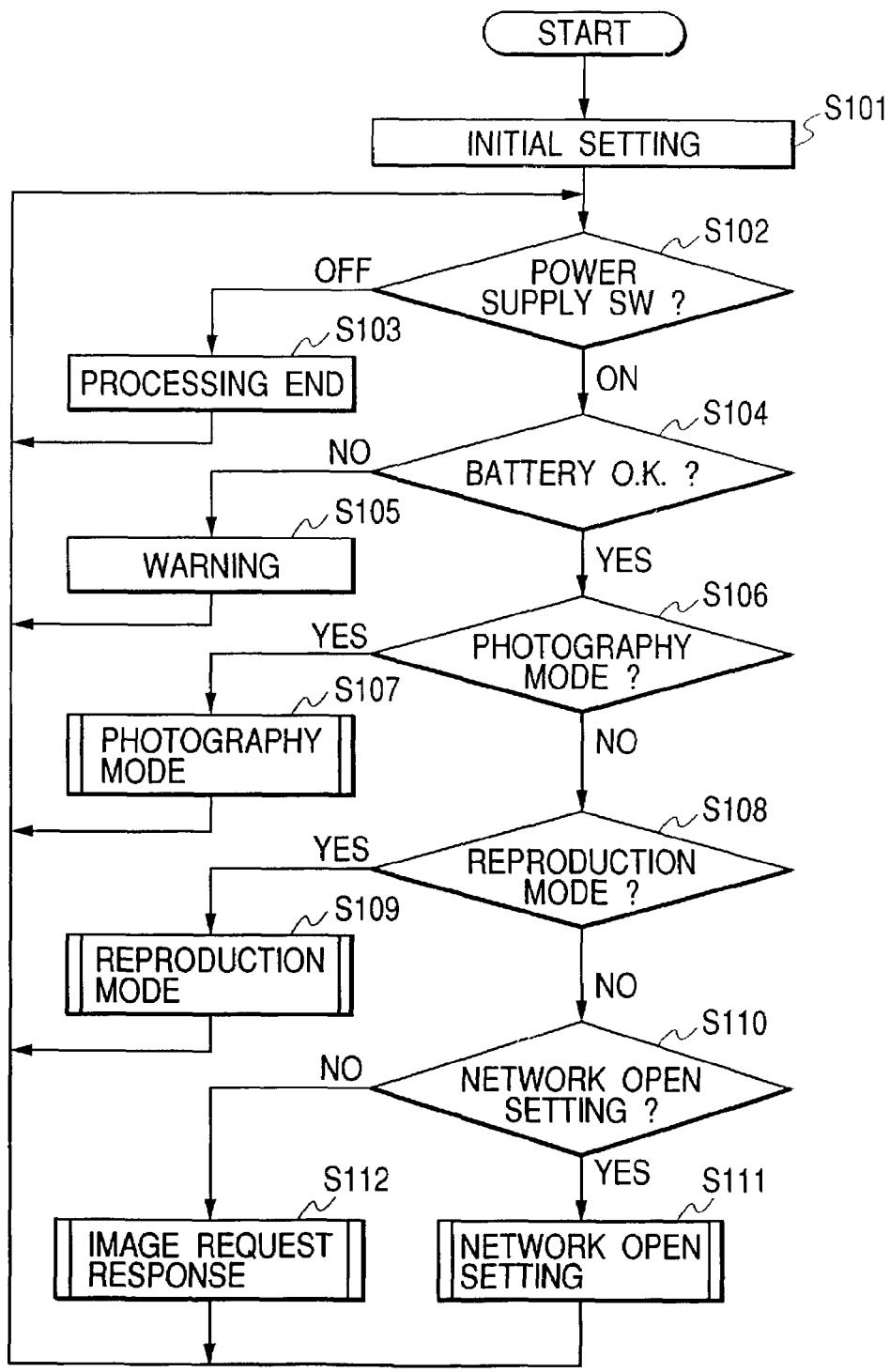

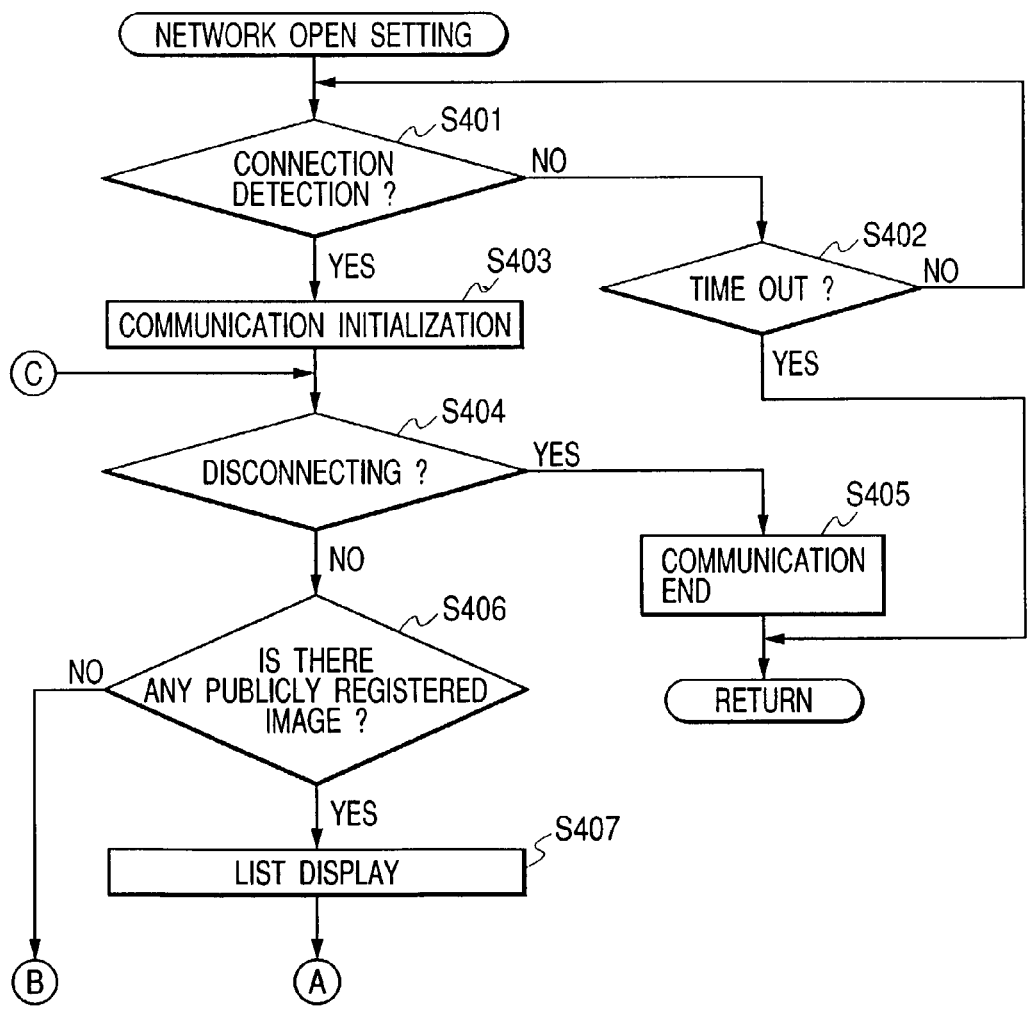

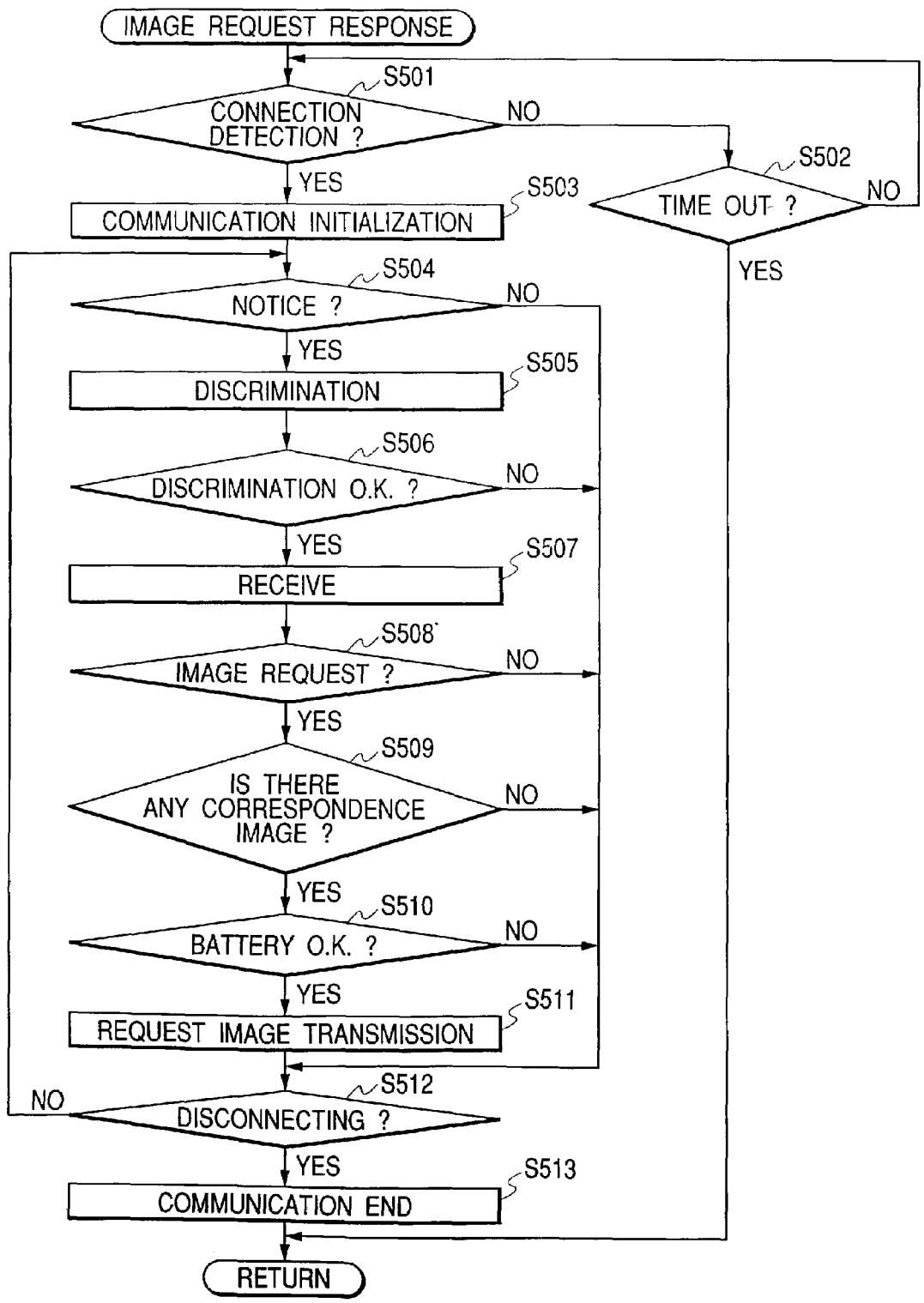

IMAGE INFORMATION MANAGING SYSTEM

BACKGROUND OF THE INVENTION

1. Field of the Invention

The present invention relates to an information managing system and method for managing information such as image data and to an image pickup apparatus constituting the information managing system.

2. Related Background Art

An image pickup apparatus such as an electronic camera is known which records, reproduces and transmits a still image or a moving image by using a memory card having solid state memory elements as a recording medium.

An image browsing system is also known which transmits or uploads an image taken with an image pickup apparatus to a WWW (world wide web) server connected to a broad network such as the Internet by using a personal computer (PC) or the like to thereby publicize the image on the network.

By using such an image browsing system, a client can connect its PC to a WWW server via the Internet to browse images uploaded to the WWW server or download images.

In using such an image browsing system, after an image is taken with an image pickup apparatus, a memory card storing photographed images is inserted into a PC. By using an application of the PC, images to be publicized are selected to upload them to a WWW server. This operation to be performed by general users is very cumbersome and complicated.

There are other systems, for example, an image pickup system in which an image taken with an image pickup apparatus is directly transmitted to a WWW server. A compact image pickup apparatus designed for portable use has almost noting which is inferior to the PC in terms of ease to view and operate. In terms of ease of use of this system, it is therefore suitable to use a method of making an image transmission reservation in advance and transmitting all reserved image data in a batch manner at the reserved time. In this case, since there is no work of selecting photographed images at the time of image data transmission, a user's work is simple. However, since the photographed images are all transmitted, there arises a problem that it is not possible to confirm in advance whether the image data is allowed to be publicized.

In any of the systems, since the storage capacity of a WWW server for storing received image data is limited, a storage capacity capable of satisfying all user needs is substantially impossible if a plurality of users share the storage capacity of the WWW server. There arises a problem that each user is required to use a WWW server in some limited range of the storage capacity.

SUMMARY OF THE INVENTION

An object of the present invention is to solve the above-described problems.

Another object of the invention is to provide a novel information managing system capable of stress-free browsing of information such as image data and an information storage system suitable for use with such an information managing system.

As a preferred embodiment for such an object, the present invention discloses an information managing system having an information storage apparatus, an information managing apparatus connected to a network, and an information processing apparatus capable of accessing the information managing apparatus via the network, the information managing system comprising: notifying means provided in the information storage apparatus for notifying the information managing apparatus of related information of main information on storage; publicizing means provided in the information managing apparatus for publicizing the related information notified by the information storage apparatus on the network; browsing means provided in the information processing apparatus for browsing the related information publicized on the network; and transferring means provided in the information processing apparatus for transmitting a transmission request command of requesting the main information related to the related information browsed by the browsing means and receiving the desired main information from the information storage apparatus.

The present invention also discloses an apparatus for photographing an image, comprising: storing means for storing photographed image data; notifying means for notifying related information of the image data stored in the storing means to an image managing server connected to a network; and transmitting means, responsive to a transmission request of the image data made by a client computer which browsed the related information notified by the image managing server via the network, for transmitting corresponding image data to the client computer.

The present invention also discloses a method of managing images by using a network, comprising: a storage step of storing an image in an image storage apparatus; a notice step of notifying related information of the stored image from the image storage apparatus to an image managing apparatus connected to the network; an open step, at the image managing apparatus, of publicizing the related information on the network; a request step, at an information processing apparatus connected to the network, of requesting the image storage apparatus to transmit a desired image designated by browsing the related information publicized on the network; a transmission step, at the image storage apparatus, of transmitting the desired image requested at the request step to the information processing apparatus; and a reception step of receiving the image transmitted at the transmission step at the information processing apparatus.

Still other objects of the present invention and the advantages thereof will become fully apparent from the following detailed description of the embodiments.

BRIEF DESCRIPTION OF THE DRAWINGS

FIG. 3 is a flow chart illustrating the main operation of the image pickup apparatus.

FIG. 7 is a flow chart illustrating an image request response process of the image pickup apparatus.

DETAILED DESCRIPTION OF THE PREFERRED EMBODIMENTS

The preferred embodiments of the present invention will now be described in detail hereinafter with reference to the accompanying drawings.

Figure 1:
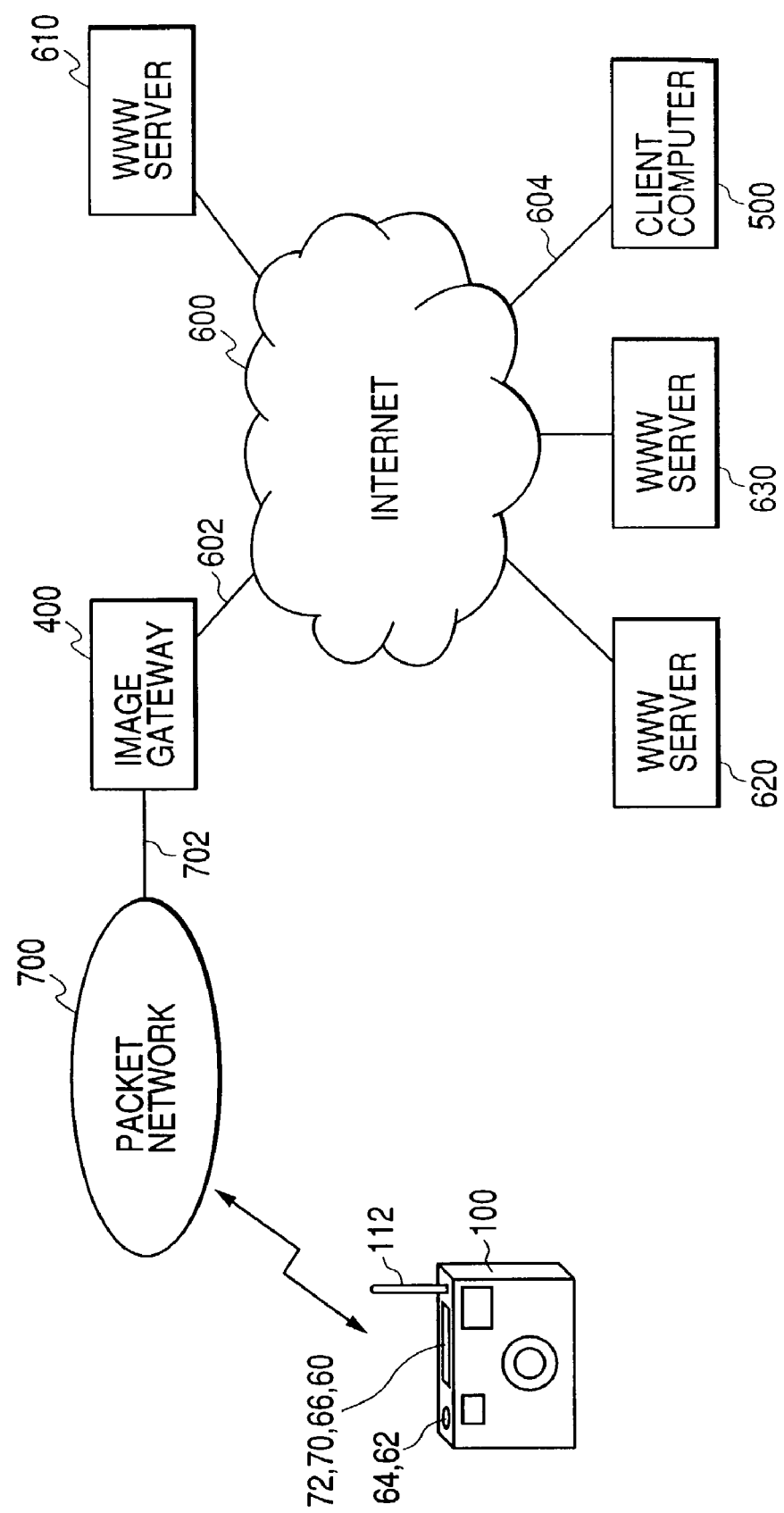
FIG. 1 is a diagram showing the structure of an information managing system to which the invention is applied.

FIG. 1 is a diagram showing the overall system structure according to an embodiment of the invention.

An information storage apparatus 100 of a portable terminal type has a communication unit 110 (in FIG. 2B) and an antenna 112. In this embodiment, an image pickup apparatus such as an electronic camera is used by way of example. An image managing apparatus 400 is an image managing server for managing image information. In this embodiment, it is also called an image gateway. An information processing apparatus 500 is a client computer used by a general user. The information processing apparatus 500 may be a personal computer (PC), a portable information apparatus, a portable phone or the like.

Reference numeral 600 represents the Internet, and reference numeral 602 represents a network interconnecting the Internet and image gateway 400. Reference numeral 604 represents a network interconnecting the Internet and the client computer 500. Reference numerals 610, 620 and 630 represent WWW servers connected to the Internet for storing, publicizing and distributing various contents information. The image gateway 400 may have the structure and function similar to those of the WWW server.

Reference numeral 700 represents a packet network including a portable phone network such as a base phone station. Reference numeral 702 represents a network interconnecting the packet network 700 and image gateway 400.

The image pickup apparatus 100 has a connection structure capable of transferring various contents such as images and commands to and from various network apparatuses such as the WWW servers 610, 620 and 630 and client computer 500 via the packet network 700, network 702, image gateway 400, network 602, and Internet 600.

(Description of Structure of Image Pickup Apparatus 100)

Figures 2, 2A, 2B:
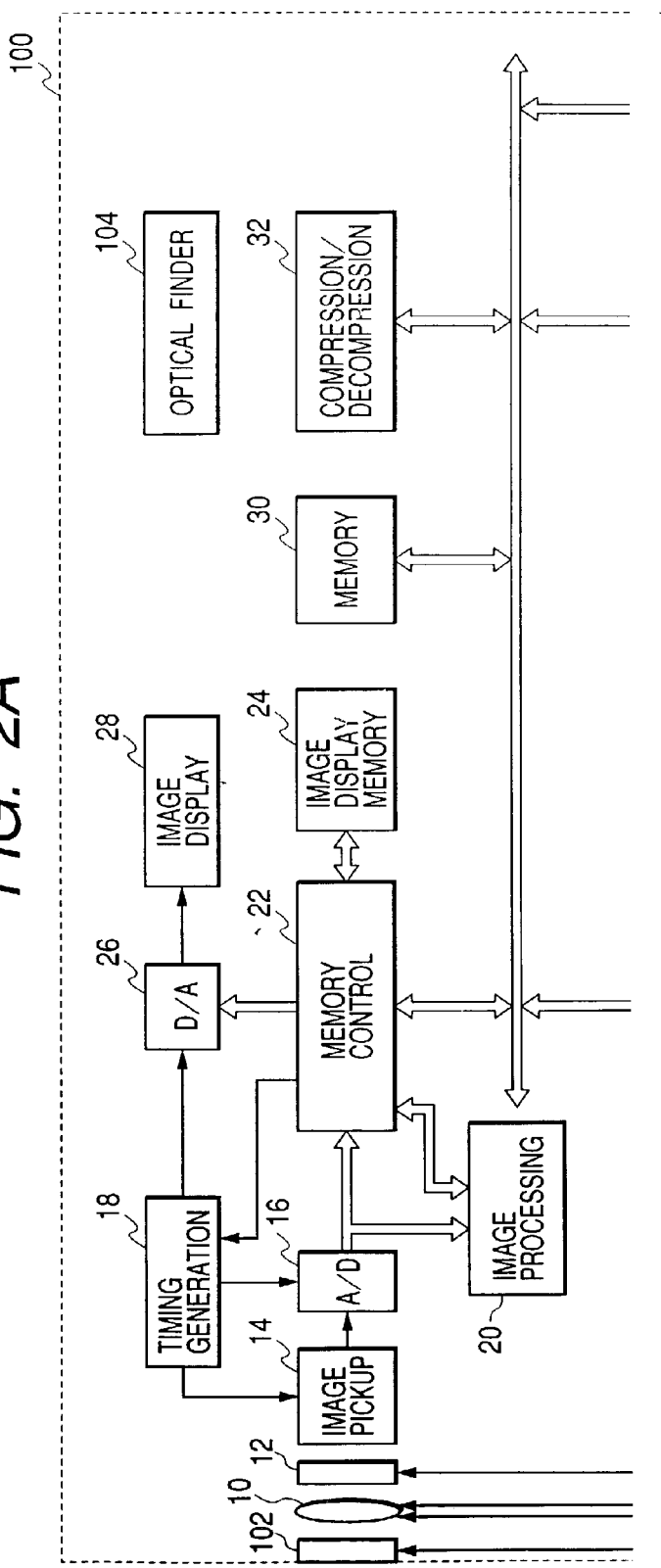
FIG. 2 composed of FIGS. 2A and 2B, is a block diagram showing the structure of an image pickup apparatus according to the invention.
Figure 2B:
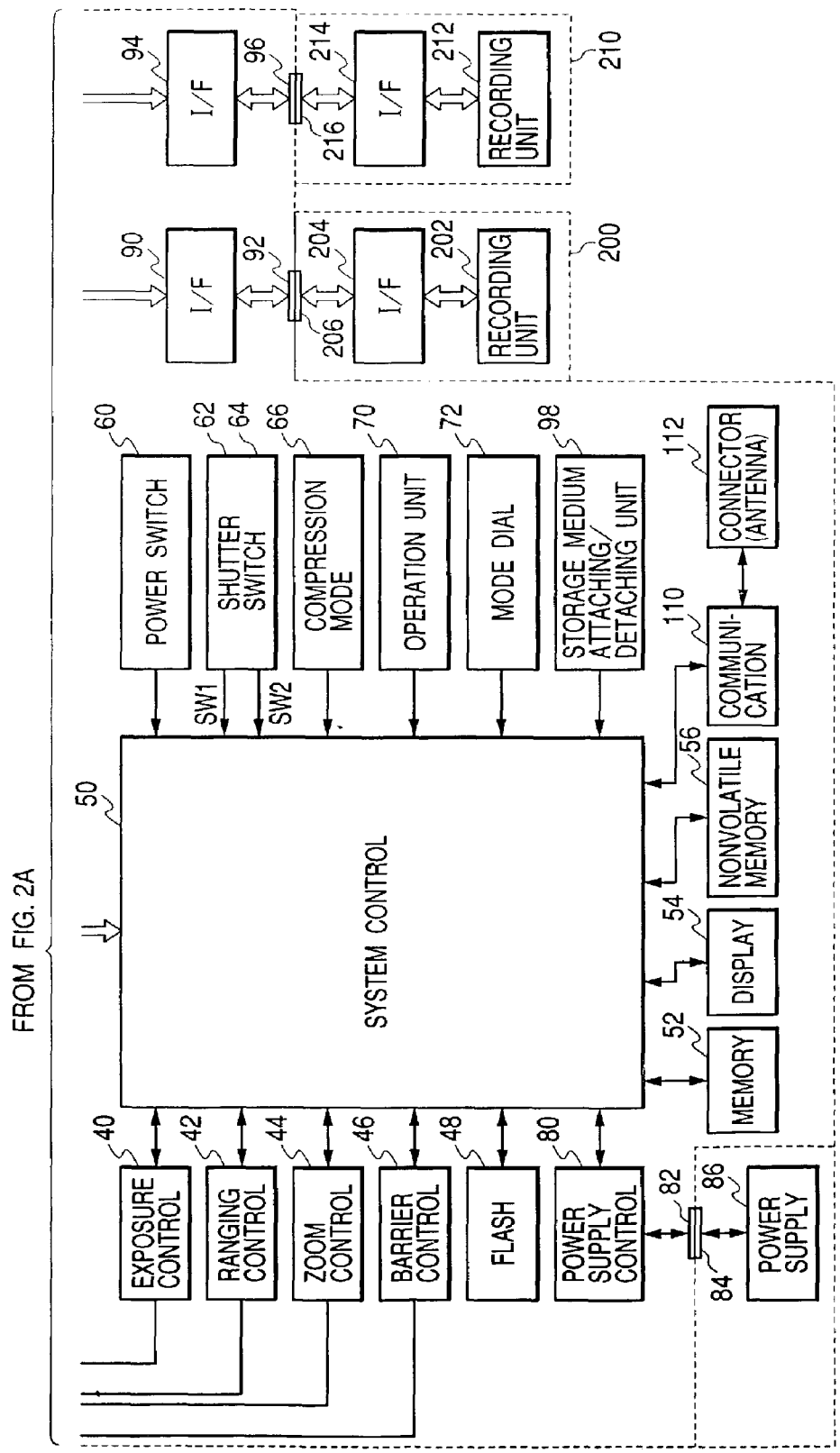

Next, with reference to FIGS. 2A and 2B, the image pickup apparatus 100 will be described.

Reference numeral 10 represents a taking lens, reference numeral 12 represents a shutter with an aperture function, reference numeral 14 represents an image pickup device for converting an optical image into electric signals, and reference numeral 16 represents an A/D converter for converting an analog signal output from the image pickup device 14 into a digital signal. Reference numeral 18 represents a timing generation circuit for supplying a clock signal and a control signal to the image pickup device 14, the A/D converter 16 and a D/A converter 26. The timing generation circuit 18 is controlled by a memory control circuit 22 and a system control circuit 50.

Reference numeral 20 represents an image processing circuit which performs predetermined pixel interpolation and color conversion processes relative to the data supplied from the A/D converter 16 and the data supplied from the memory control circuit 22. The image processing circuit 20 performs predetermined calculation processes by using picked-up image data, and in accordance with the calculated results the system control circuit 50 controls an exposure control unit 40 and a ranging control unit 42 to perform an auto focus (AF) process, an auto exposure (AE) process and an electronic flash pre-emission (EF) process, respectively of a through-the-lens (TTL) type. The image processing circuit 20 performs predetermined calculation processes by using picked-up image data, and in accordance with the calculated results it performs an auto white balance (AWB) process of the TTL type.

The memory control circuit 22 controls the A/D converter 16, the timing generation circuit 18, the image processing circuit 20, an image display memory 24, the D/A converter 26, a memory 30 and a compression/decompression circuit 32. Data output from the A/D converter 16 is written in the image display memory 24 or memory 30 via the image processing circuit 20 and memory control circuit 22, or directly via the memory control circuit 22.

Reference numeral 24 represents the image display memory, reference numeral 26 represents the D/A converter, and reference numeral 28 represents an image display unit made of TFT LCD and the like. Image data written in the image display memory 24 is supplied via the D/A converter 26 to the image display unit 28 to display the image. An electronic finder function can be realized by sequentially displaying picked-up images on the image display unit 28. In response to an instruction from the system control circuit 50, the image display unit 28 can turn on or off a displayed image. While an image display is turned on, the power consumption of the image pickup apparatus 100 can be reduced considerably.

The memory 30 stores still images and moving images, and has a storage capacity sufficient for storing a predetermined number of still and moving images. It is therefore possible to write a large number of images in the memory 30 at high speed during continuous shot photography for continuously taking a plurality of still images and during panorama photography. The memory 30 can be used as a working area of the system control circuit 50.

The compression/decompression circuit 32 compresses or decompresses image data by adaptive discrete cosine transform (ADCT) or the like. The compression/decompression circuit 32 reads an image stored in the memory 30 and performs a compression process or a decompression process, and writes the processed data in the memory 30.

The exposure control unit 40 controls the shutter 12 with the aperture function, and has a flash light control function in cooperation with the flash 48. The ranging control unit 42 controls the focussing of the taking lens 10. A zoom control unit 44 controls the zooming of the taking lens 10. A barrier control unit 46 controls the operation of a protection unit 102 or a barrier. The flash 48 has also an AF auxiliary light projection function and a flash light control function.

The exposure control unit 40 and ranging control unit 42 are controlled by the TTL approach. In accordance with the process results of picked-up image data by the image processing circuit 20, the system control circuit 50 controls the exposure control unit 40 and ranging control unit 42. The system control circuit 50 controls the whole of the image pickup apparatus 100. A memory 52 stores constants, variables, programs and the like for the operation of the system control circuit 50.

A display unit 54 made of a liquid crystal display unit, a speaker and the like displays an operation status, a message and the like by using characters, images, voices and the like in response to an execution of a program by the system control circuit 50. The components of the display unit 54 are mounted at one or a plurality of positions easy to view near at an operation unit of the image pickup apparatus 100. The display unit 54 is made of, for example, an LCD panel, a sound producing element and the like. Some functions of the display unit 54 may be installed in an optical finder 104.

The display contents of the display unit 54 may be a single/continuous shot, a compression factor, the number of photographed images, the number of remaining images capable of being photographed, a shutter speed, an aperture value, an exposure correction, a flash state, a connection state to an external computer and the like.

An electrically erasable and programmable nonvolatile memory 56 may be an EEPROM or the like.

Operation members 60, 62, 64, 66, 70 and 72 are used for entering various operation instructions for the system control circuit 50. These members may be one or a plurality of combinations of a switch, a dial, a touch panel, a pointing device by sight line detection, a voice recognition apparatus and the like.

These operation members will be described specifically.

A power switch 60 is used for switching between turn-on and turn-off of the power of the image pickup apparatus 100.

A shutter switch (SW1) 62 and a shutter switch (SW2) 64 are of a two-step structure. The operation by SW1 effects a focussing operation and the like, and the operation by SW2 effects a series of operations from photography to image recording.

A compression mode switch 66 is used for selecting a compression factor of JPEG compression or a CCDRAW mode for digitalizing signals of the image pickup device itself and storing them.

For example, a normal mode (standard image quality) and a fine mode (high image quality) are prepared for the JPEG compression mode.

In the CCDRAW mode, image data is read directly from each line in accordance with the color filter pixel layout of the image pickup device 14. The image data written in the memory 30 via the A/D converter 16 and memory control circuit 22 is read and recorded in a recording medium 200 or 210.

An operation unit 70 is made of various buttons, a touch panel and the like, including a menu button, a menu scroll button, a reproduction button, a reproduction image select button, an image display ON/OFF button and the like.

A mode dial switch 72 is used for switching between various function modes including an auto photography mode, a photography mode, a panorama photography mode, a reproduction mode, a multi-image reproduction/erase mode, a PC connection mode and the like.

A power control unit 80 is made of a remaining battery capacity detector circuit, a switching circuit for switching between circuit blocks to be powered, and the like. In accordance with a detection result or an instruction from the system control circuit 50, the power control unit 80 supplies each circuit block including the recording medium with a necessary voltage during a necessary period.

Reference numerals 82 and 84 represent connectors, and reference numeral 86 represents a power unit made of a primary battery such as a alkali battery and a lithium battery or a secondary battery such as a NiCd battery, a NIMH battery and a Li-ion battery, an AC adapter and the like.

Reference numerals 90 and 94 represent interfaces to the recording medium such as a memory card and a hard disk. Reference numerals 92 and 96 represent connectors for connection to the recording medium such as a memory card and a hard disk. Reference numeral 98 represents a recording medium mount detecting unit for detecting whether the recording medium 200 or 210 is mounted on the connector 92 or 96.

In this embodiment, two interfaces and two connectors for connection to the recording medium are used. One or a plurality of interfaces and connectors may be used.

If the interface 90 and 94 and connectors 92 and 96 axe in conformity with the PCMCIA or compact flash (CF) card specifications, various communication cards such as a LAN card, a modem card, aUSB card, an IEEE1394 card, a P1284 card, a SCSI card, a PHS communication card can be connected to transfer image data and management information of image data to and from another computer or a peripheral machine such as a printer.

The protection unit 102 or barrier covers the image pickup unit including the lens 10 of the image pickup apparatus 100 to prevent blurs and damage to the image pickup unit.

The optical finder 104 is used for photographing an image without using the electronic finder function of the image display unit 28.

The communication unit 110 has a portable phone communication function of a PDC type, a CDMA type, a W-CDMA type, a PHS type or the like. The communication unit 110 may have various communication functions such as RS232C, USB, IEEE1394, P1284, SCSI, modem, LAN, and wireless communication such as Bluetooth.

Reference numeral 112 represents a connector for wired-connection of the image pickup apparatus 100 to another apparatus via the communication unit 110, or represents a transmitter unit and an antenna for connection to the network via the packet network by wireless communication.

The recording medium 200 may be a memory card, a hard disk or the like. The recording medium 200 is constituted of a recording unit 202 such as a semiconductor memory and a magnetic disk, an interface 204 to the image pickup apparatus 100, and a connector 206 to the image pickup apparatus 100.

The recording medium 210 may be a memory card, a hard disk or the like. The recording medium 210 is constituted of a recording unit 212 such as a semiconductor memory and a magnetic disk, an interface 214 to the image pickup apparatus 100, and a connector 216 to the image pickup apparatus 100.

(Description of Structure of Image Gateway (Image Managing Apparatus) 400))

Figure 10:
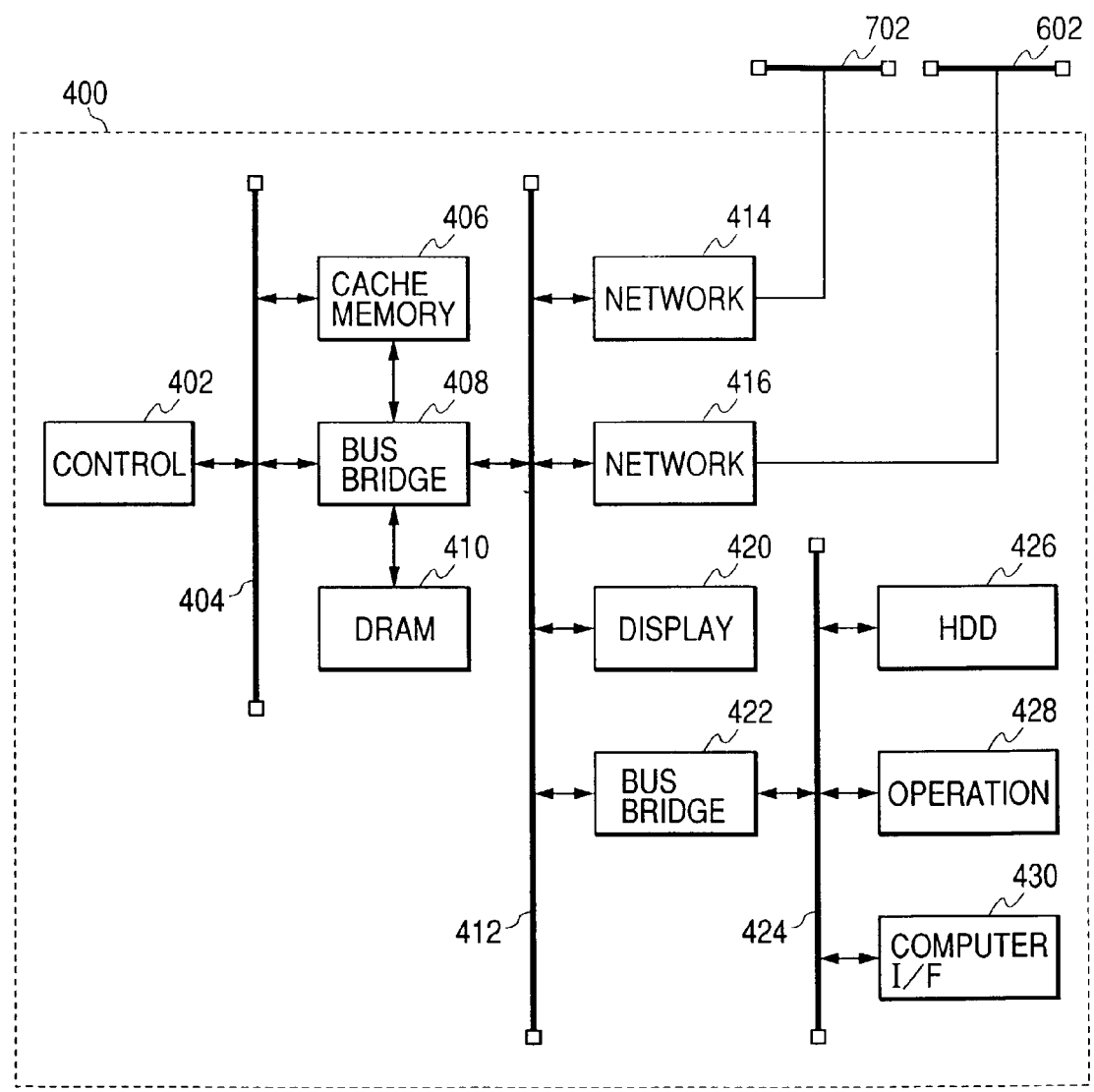
FIG. 10 is a block diagram showing the structure of an image managing apparatus (image gateway) according to the invention.

With reference to FIG. 10, the structure of the image gateway 400 or image managing apparatus will be described.

A control unit 402 controls the whole of the image managing apparatus.

A CPU bus 404 interconnects the control unit 402, a cache memory 406 and a bus bridge 408 to transfer data processed by the control unit 402 at high speed.

The cache memory 406 can be accessed at high speed by the control unit 402 for the operation thereof, and temporarily stores data to be used for the calculation by the control unit 402. Generally, a high speed RAM or the like is used as the cache memory.

The bus bridge 408 interconnects the CPU bus 404 and a high speed bus 412 to be described later, and absorbs a difference between process speeds of the buses. The control unit 402 operating at higher speed can transfer data to and from each unit connected to the high speed bus 412 via the bus bridge 408. The bus bridge 408 has also a memory controller function for a series of memory management operations. Namely, data temporarily written in the cache memory 406 by the control unit 402 at high speed is read into a DRAM 410 at predetermined timings, and data read from DRAM 410 in response to a request from the control unit 402 is written in the cache memory 406.

DRAM 410 is a main memory used by the control unit 402 to execute various applications. Generally, an SDRAM or the like is used.

The high speed bus 412 interconnects the bus bridge 408, a network unit 414, a network unit 416, a display unit 420, and a bus bridge 422. The high speed bus 412 is used for transferring data processed by the control unit 402 to each unit or transfer (DMA transfer) data between respective units at high speed. Generally, a PCI bus or the like is used.

The network unit 414 is used for connecting the image managing apparatus 400 to the network 702 to transfer data to and from the network. Generally, an Ethernet network or the like is used. The image managing apparatus 400 can connect the packet network 700 including a portable phone network such as a base phone station via the network unit 414 and network 702.

The network unit 416 is used for connecting the image managing apparatus 400 to the network 602 to transfer data to and from the network. Generally, an Ethernet network or the like is used. The image managing apparatus 400 can connect the Internet 600 via the network unit 416 and network 602.

The display unit 420 is constituted of a liquid crystal display apparatus, a speaker and the like, and displays necessary characters, images, voices and the like in response to an execution of a program by the control unit 402.

The bus bridge 422 interconnects the high speed bus 412 and a low speed bus 424 to be described later, and absorbs a difference between process speeds of the buses. By using the bus bridge 424, each unit operating at high speed can transfer data to and from a unit connected to the low speed bus 424 and operating at low speed.

The low speed bus 424 interconnects the bus bridge 422, a hard disk drive 426, an operation unit 428 and a computer interface 430. The low speed bus has a data transfer speed lower than the high speed bus 412 and is used for the connection to units having a relatively low processing ability. Generally, an ISA bus or the like is used.

The hard disk drive 426 drives hard disks storing a plurality of applications and various information necessary for the operation by the control unit 402, and is controlled by the control unit 402. Information in another information storage apparatus such as the image pickup apparatus 100 and information of the storage data are also stored in the hard disks.

The operation unit 428 is constituted of a keyboard, a microphone and the like and enters various settings necessary for the operation by the image managing apparatus 400, and/or various operation instructions for the control unit 402.

The low speed computer interface 430 connects the image managing apparatus and peripheral machines. Generally, RS632C for serial communication, Centronics interface for parallel communication, P1284 or the like is used.

(Description of Structure of Client Computer (Information Processing Apparatus) 500)

Figure 13:
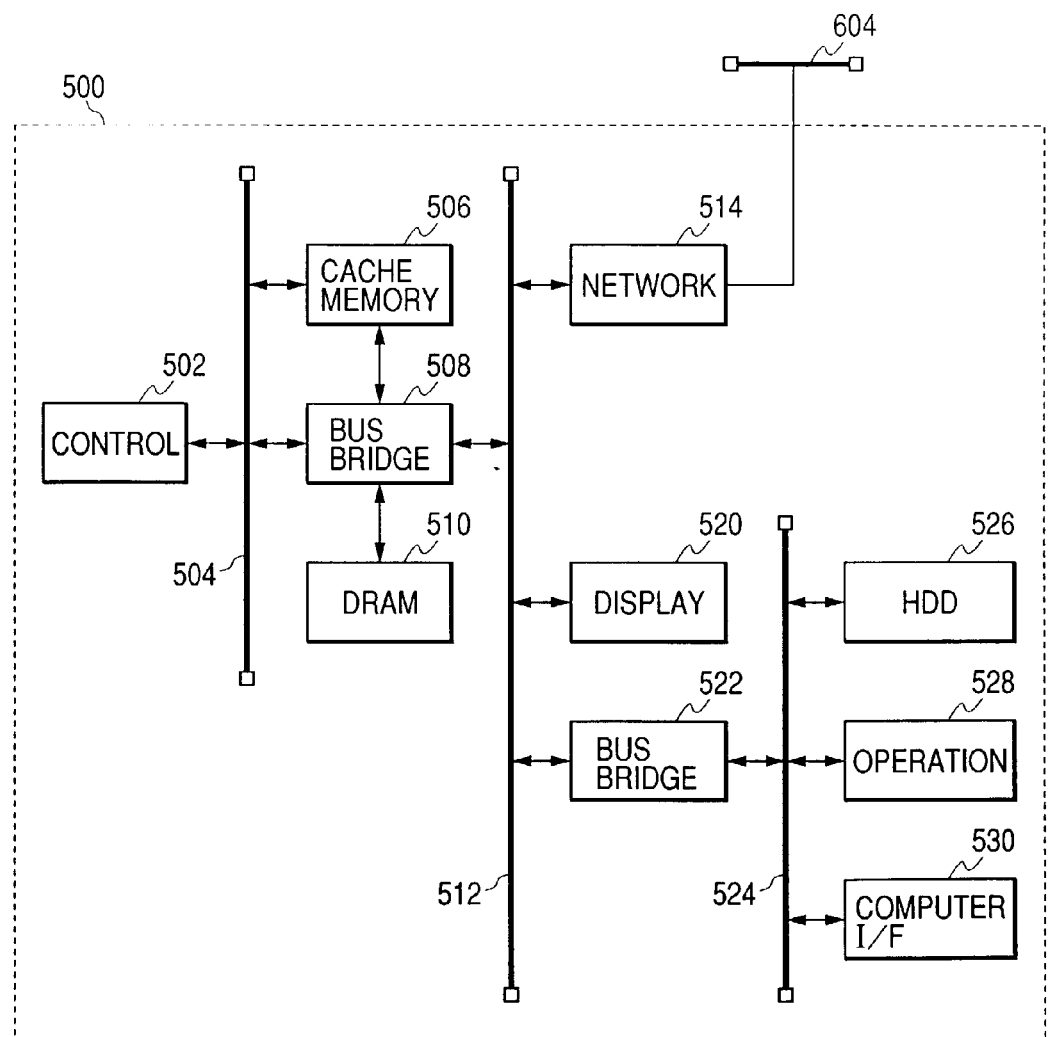
FIG. 13 is a block diagram showing the structure of an information processing apparatus (client computer) according to the invention.

Next, with reference to FIG. 13, the structure of the client computer 500 or information processing apparatus will be described.

A control unit 502 controls the whole of the information processing apparatus 500. A CPU bus 504 interconnects the control unit 502, a cache memory 506 and a bus bridge 508 to transfer data processed by the control unit 502 at high speed. The cache memory 506 can be accessed at high speed by the control unit 502 for the operation thereof, and temporarily stores data to be used for the calculation by the control unit 502. Generally, a high speed RAM or the like is used as the cache memory.

The bus bridge 508 interconnects the CPU bus 504 and a high speed bus 512 to be described later, and absorbs a difference between process speeds of the buses. The control unit 502 operating at higher speed can transfer data to and from each unit connected to the high speed bus 512 via the bus bridge 508. The bus bridge 508 has also a memory controller function for a series of memory management operations. Namely, data temporarily written in the cache memory 506 by the control unit 502 at high speed is read into a DRAM 510 at predetermined timings, and data read from DRAM 510 in response to a request from the control unit 502 is written in the cache memory 506. DRAM 510 is a main memory used by the control unit 502 to execute various applications. Generally, an SDRAM or the like is used.

The high speed bus 512 interconnects the bus bridge 508, a network unit 514, a display unit 520, and a bus bridge 522. The high speed bus 512 is used for transferring data processed by the control unit 502 to each unit or transfer (DMA transfer) data between respective units at high speed. Generally, a PCI bus or the like is used.

The network unit 514 is used for connecting the information processing apparatus 500 to the network 604 to transfer data to and from the network. Generally, an Ethernet network or the like is used. The information processing apparatus 500 can connect the Internet 600 via the network unit 514 and network 604.

The display unit 520 is constituted of a liquid crystal display apparatus, a speaker and the like, and displays necessary characters, images, voices and the like in response to an execution of a program by the control unit 502. The bus bridge 522 interconnects the high speed bus 512 and a low speed bus 524 to be described later, and absorbs a difference between process speeds of the buses. By using the bus bridge 524, each unit operating at high speed can transfer data to and from a unit connected to the low speed bus 524 and operating at low speed.

The low speed bus 524 interconnects the bus bridge 522, a hard disk drive 526, an operation unit 528 and a computer interface 530. The low speed bus has a data transfer speed lower than the high speed bus 512 and is used for the connection to units having a relatively low processing ability. Generally, an ISA bus or the like is used. The hard disk drive 526 drives hard disks storing a plurality of applications and various information necessary for the operation by the control unit 502, and is controlled by the control unit 502. Contents such as images downloaded from the network are also stored in the hard disks.

The operation unit 528 is constituted of a keyboard, a microphone and the like and enters various settings necessary for the operation by the image managing system 500, and/or various operation instructions for the control unit 502.

The low speed computer interface 530 connects the information processing apparatus 500 and peripheral machines. Generally, RS632C for serial communication, Centronics interface for parallel communication, P1284 or the like is used.

(Description of Operation of Image Pickup Apparatus 100)

With reference to FIGS. 3 to 9, the operation of the image pickup apparatus of the invention will be described.

FIG. 3 is a flow chart illustrating the main routine of the image pickup apparatus 100.

Upon turn-on of the power after the apparatus is newly bought or a battery is exchanged, the system control circuit 50 initializes flags, control variables and the like, and initializes each block of the image pickup apparatus 100 (S101). The system control circuit 50 judges a setting position of the power switch 60 and if the power switch 60 is set to the power-OFF (S102), the system control circuit 50 stops displaying images on each display unit and stores necessary parameters and setting values including flags, control variables and the like and a set mode in the non-volatile memory 56, and the power control unit 80 performs a predetermined end process such as turning off unnecessary powers of each block of the image pickup apparatus 100 including the image display unit 28 (S103), to thereafter return to S102.

If the power switch 60 is set to the power-ON (S102), the flow advances to S104. The system control circuit 50 requests the power control unit 80 to judge whether the remaining capacity and operation status of the power unit 86 poses any problem of the operation by the image pickup apparatus 100 (S104), and if there is any problem, the display unit 54 performs a predetermined alarm display by using images or voices (S105) to thereafter return to S102. If there is no problem of the power unit 86 (S104), the flow advances to S106.

The system control circuit 50 judges the setting position of the mode dial 72, and if the photography mode is set (S106), a photography mode process is executed (S107) and after this process is completed, the flow returns to S102. The details of the photography mode process S107 will be later given with reference to FIG. 4.

If the mode dial 72 is set to a reproduction mode (S108), the system control circuit 50 executes a predetermined reproduction mode process (S109) and after this process is completed, the flow returns to S102. The details of the reproduction mode process S109 will be later given with reference to FIG. 5.

If the mode dial 72 is set neither to the photography mode nor to the reproduction mode (S106, S108), the flow advances to S110. If a network open setting process is to be performed (S110), the system control circuit 50 executes a network open setting process (S111) and after this process is completed, the flow returns to S102.

In this network open setting routine S111, setting of public information stored in the image managing apparatus (image gateway) 400 can be altered by operating the operation unit 70 or entering an instruction from the user interface, respectively of the image pickup apparatus 100. The public information is the registered related information of each image stored in the image pickup apparatus 100, indicating whether the image can be publicized on the Internet, and includes indices made of a reduced image, a file name and the like of each image. The image pickup apparatus 100 can remotely change the setting of the public information to a public/secret state of the registered public information. It is also possible to set an open setting state for making all registered images public or a close setting state for making all registered images secret, or to add/delete an image. The details of this network open setting process S111 will be later given with reference to FIGS. 6A and 6B.

If the network open setting process is not to be performed (S110), an image request response process is executed (S112) and after this process is completed, the flow returns to S102.

In the image request response process routine S112, in response to an image transmission request from the information processing apparatus (client computer) 500, the image pickup apparatus 100 can transmit the requested image (a copy of original image data) to the image processing apparatus. In this case, the information processing apparatus can browse the public information of various information storage apparatus including the image pickup apparatus 100 publicized on the Internet and stored in the image managing apparatus, and transmits the image transmission request by referring to the public information. The details of this image request response process S112 will be later given with reference to FIG. 7.

Figure 4:
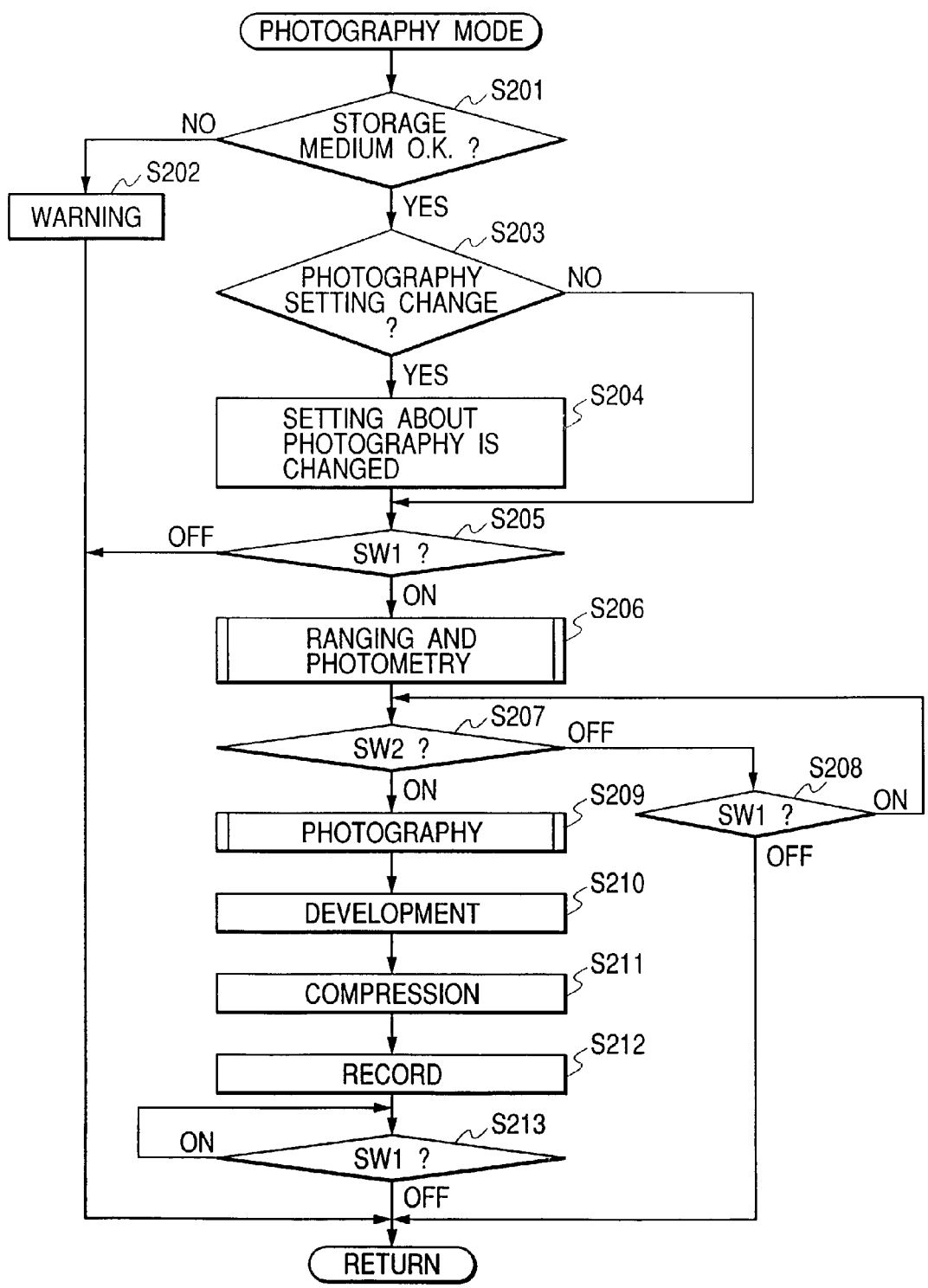
FIG. 4 is a flow chart illustrating the operation in a photography mode of the image pickup apparatus.

FIG. 4 is a flow chart illustrating the details of the photography mode process at S107 shown in FIG. 3.

The system control circuit 50 judges whether the operation status of the recording medium 200 or 210 poses any problem of the operation by the image pickup apparatus 100, particularly of the image data recording and reproducing operation of the recording medium (S201), and if there is any problem, the display unit 54 performs a predetermined alarm display by using images or voices (S202) to thereafter terminate the photography mode process routine S107. If there is no problem of the operation of the recording medium 200 or 210 (S201), the flow advances to S203.

Next, if a user alters various photography settings by using various switches of the operation unit 70 (S203), in accordance with the altered contents the system control circuit 50 alters the photography operation settings (S204).

Next, if the shutter switch SW1 is not depressed (S205), the system control circuit 50 controls to terminate the photography mode process routine S107, whereas if the shutter switch SW1 is depressed (S205), the system control circuit 50 executes a ranging process to set the focal point of the taking lens 10 to a subject to be photographed and executes a photometry process to determine an aperture value and shutter speed (S206). In the photometry process, flash setting is also performed if necessary. The details of the ranging and photometry process S206 will be later given with reference to FIG. 8.

If the shutter switch SW2 is not depressed (S207) and the shutter switch SW1 is also released (S208), the photography mode process routine S107 is terminated.

If the shutter switch SW2 is depressed (S207), a photography process is executed (S209). The photography process includes: an exposure process of writing photographed image data in the memory via the image pickup device 12, A/D converter 16, image processing circuit 20 and memory control circuit 22, or directly from the memory control circuit 22 via the A/D converter; and a developing process of performing various processes by reading image data written in the memory 30 by using the memory control circuit 22 and if necessary the image processing circuit 20. The details of the photography process S209 will be later given with reference to FIG. 9.

After the photography process S209, a developing process such as a predetermined pixel interpolation process and a color conversion process is performed by reading the photographed image data written in the memory 30 and using the memory control circuit 22 and if necessary the image processing circuit 20, and the image data after the developing process is stored in a predetermined field of the memory 30 (S210) to thereafter advance to S211.

Next, the compression/decompression circuit 32 performs an image compression process corresponding to the set compression mode for the image data stored in the predetermined field of the memory 30 (S211), the compressed image data is read from the memory and written in the recording medium 200 or 210 such as a memory card and a compact flash card via the interface 90 or 94 and the connector 92 or 96 (S212).

The system control circuit 50 repeats the current process until the shutter switch SWI is released (S213), and stops a series of photography operations and terminates the photography mode process routine S107 when the shutter switch SW1 is released (S213).

Figure 5:
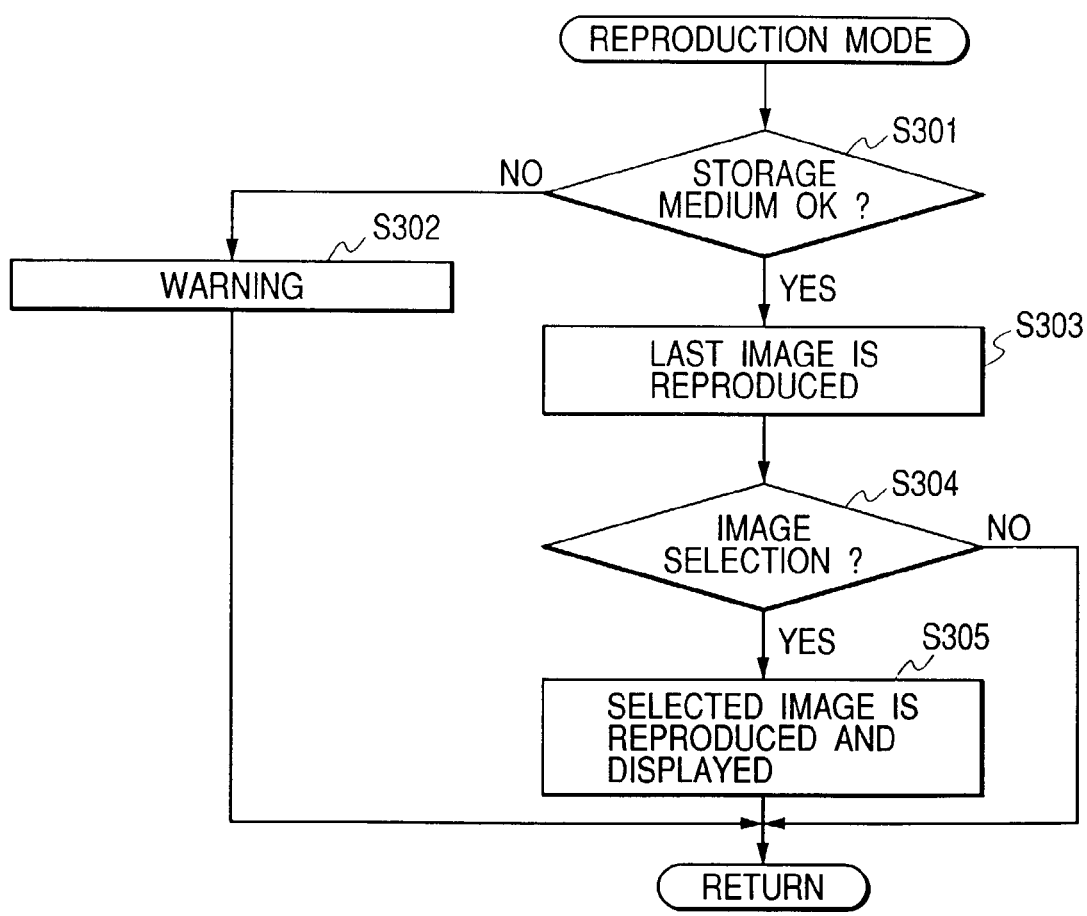
FIG. 5 is a flow chart illustrating the operation in a reproduction mode of the image pickup apparatus.

FIG. 5 is a flow chart illustrating the details of the reproduction mode process at S109 shown in FIG. 3. The system control circuit 50 judges whether the operation status of the recording medium 200 or 210 poses any problem of the operation by the image pickup apparatus 100, particularly of the image data recording and reproducing operation of the recording medium (S301), and if there is any problem, the display unit 54 performs a predetermined alarm display by using images or voices (S302) to thereafter terminate the reproduction mode process routine S109.

If there is no problem of the operation of the recording medium 200 or 210 (S301), the flow advances to S303.

The system control circuit 50 reads the last photographed image among one or a plurality of photographed images recorded in the recording medium 200 or 210 via the connector 92 or 96 and the interface 90 or 94, and writes the last photographed image in a predetermined field of the memory 30. The image written in the memory 30 is subjected to a predetermined image decompression process by using the compression/decompression circuit 32 and thereafter reproduced and displayed by the image display unit 28 via the memory controller 22 and D/A converter 26 (S303).

When an image to be reproduced is selected in response to an input from the switch, dial or the like of the operation unit 70 (S304), the selected image is read from the recording medium 200 or 210 and reproduced and displayed by the image display unit 28 (S305). After a series of processes is completed, the reproduction mode process routine S109 is terminated.

Figure 6B:
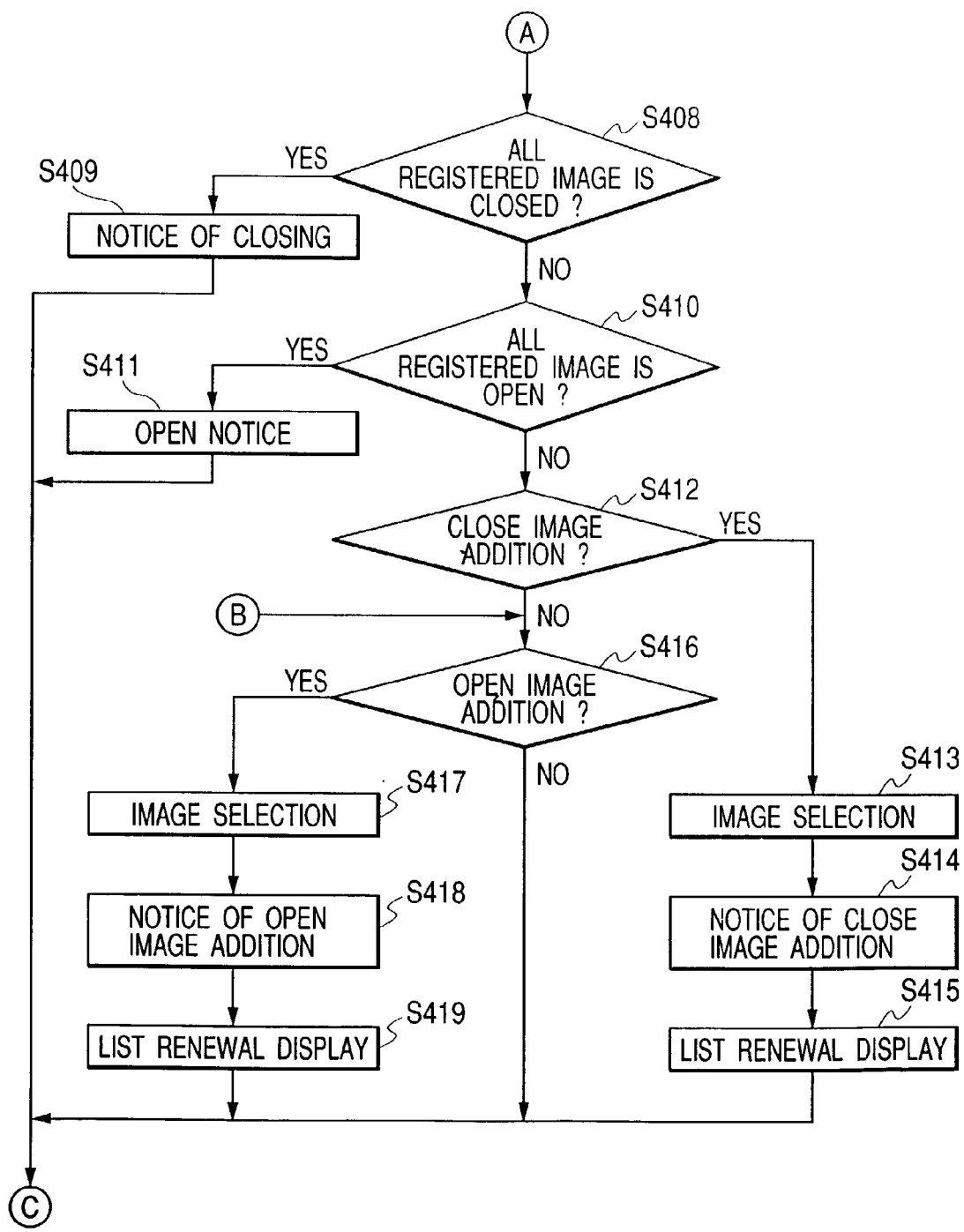
FIG. 6 composed of FIGS. 6A and 6B, is a flow chart illustrating a network open setting process of the image pickup apparatus.

FIGS. 6A and 6B are flow charts illustrating the details of the network open setting process at S111 shown in FIG. 3. The system control circuit 50 continues a connection detection to the packet network 700 including a base portable phone station during a predetermined time by using an unrepresented detection function via the communication unit 110 which is a wireless communication I/F such as a portable phone (S401, S402). If a connection to the packet network 700 is not detected in the predetermined time, it is regarded as time-out (S402) and the network open setting process routine S111 is terminated.

If a connection to the packet network 700 is detected (S401), the communication function including the communication unit 110 is initialized (S403).

Next, it is judged whether a communication connection between the communication unit 110 and packet network 700 is disconnected (S404). If not disconnected, the flow advances to S406, whereas if disconnected (S404), the system control circuit 50 executes a predetermined communication end process for the communication function including the communication unit 110 (S405) to thereafter terminate the network open setting process routine S111.

At S406 the system control circuit 50 judges whether an image registered as open (public) and publicized by the image managing apparatus (image gateway) 400 exists in the image pickup apparatus 100 and/or the recording medium 200 and/or 210 (S406). If there is no image registered as open, the flow skips to S416. Whether there is an image registered as open can be judged by referring to the management information of image data stored in a predetermined field of the image pickup apparatus 100, and/or the management information in the recording medium 200 or 210, and/or the public information stored in the image managing apparatus (image gateway) 400. If the public information stored in the image managing apparatus (image gateway) 400 is used, the system control circuit 50 requests necessary management information from the image managing apparatus (image gateway) 400 via the packet network 700 and network 702, and after authentication, can acquire this management information.

If it is judged at S406 that there is an image registered as open, a list of images registered as open (S407) is displayed on the image display unit 28 and/or display unit 54 to thereafter advance to S408.

If close setting is made in response to an input by the switch, dial or the like of the operation unit 70 to make secret all registered open images on the Internet (S408), then close setting is notified to the image managing apparatus (image gateway) 400 via the packet network 700 and network 702 (S409) to thereafter return to S404. If close setting is not made to make secret all registered open images (S408), the flow advances to S410.

If open setting is made in response to an input by the switch, dial or the like of the operation unit 70 to make open all registered open images on the Internet (S410), then open setting is notified to the image managing apparatus (image gateway) 400 via the packet network 700 and network 702 (S411) to thereafter return to S404. If open setting is not made to make open all registered open images (S410), the flow advances to S412.

If an addition operation is made in response to an input by the switch, dial or the like of the operation unit 70 to add a close image to registered open images on the Internet (S412), the image to be registered as secret is selected in response to an input by the switch, dial or the like of the operation unit 70 (S413), addition of the close image is notified to the image managing apparatus (image gateway) 400 via the packet network 700 and network 702 (S414), and a list of renewed images registered as open is displayed on the image display unit 28 and/or display unit 54 (S415) to return to S404. If an addition operation to add an image to be registered as secret is not made (S412), the flow advances to S416.

At Step S413 one or a plurality of images to be registered as close among one or a plurality of photographed images recorded in the recording medium 200 or 210 is read via the connector 92 or 96 and interface 90 or 94, by referring to the management information of image data stored in a predetermined field of the image pickup apparatus 100, and/or the management information in the recording medium 200 or 210, and/or the public information stored in the image managing apparatus (image gateway) 400. The read one or a plurality of images are written in a predetermined field of the memory 30. The image written in the memory 30 is subjected to a predetermined image decompression process by the compression/decompression circuit 32, and thereafter displayed on the image display unit 28 via the memory control circuit 22 and D/A converter 26 to thereby reproduce and display the image or images to be registered as secret.

If an addition operation is made in response to an input by the switch, dial or the like of the operation unit 70 to add an open image to registered open images on the Internet (S412), the image to be registered as open is selected in response to an input by the switch, dial or the like of the operation unit 70 (S417), addition of the open image is notified to the image managing apparatus (image gateway) 400 via the packet network 700 and network 702 (S418), and a list of renewed images registered as open is displayed on the image display unit 28 and/or display unit 54 (S419) to return to S404. If an addition operation to add an image to be registered as open is not made (S416), the flow returns to S404.

At Step S417 one or a plurality of images to be registered as open among one or a plurality of photographed images recorded in the recording medium 200 or 210 is read via the connector 92 or 96 and interface 90 or 94, by referring to the management information of image data stored in a predetermined field of the image pickup apparatus 100, and/or the management information in the recording medium 200 or 210, and/or the public information stored in the image managing apparatus (image gateway) 400. The read one or a plurality of images are written in a predetermined field of the memory 30. The image written in the memory 30 is subjected to a predetermined image decompression process by the compression/decompression circuit 32, and thereafter displayed on the image display unit 28 via the memory control circuit 22 and D/A converter 26 to thereby reproduce and display the image or images to be registered as open.

If a newly photographed image or an image still not registered is to be registered as open in the image managing apparatus (image gateway) 400, one or a plurality of photographed images are sequentially read from the recording medium 200 or 210 and reproduced in response to an input by the switch, dial or the like of the operation unit 70, and the image to be registered is selected. The related information of indices and the like including a thumbnail or reduced image of the selected image, a file name and the like is notified to the image managing apparatus (image gateway) 400 to thereby add the image as public information.

A mode may be added which notifies a new registration to the image managing apparatus (image gateway) 400 in response to photographing an image. In this mode, the shutter switch provides a function similar to image selection. The related information of indices and the like including a thumbnail of the photographed image, a file name and the like is notified to the image managing apparatus (image gateway) 400 each time an image is photographed. Open setting, close setting and the like after public registration are similar to those described earlier.

As described above, according to the network open setting process routine S111, setting of public information of open images in the image pickup apparatus registered in the image managing apparatus and publicized on the Internet can be altered by operating the operation unit 70 or entering an instruction from the user interface, respectively of the image pickup apparatus 100. It is therefore possible to change each registered open image to a close image. Open setting for making all registered images open, close setting for making all resisted images close, addition/deletion of an image can also made.

FIG. 7 is a flow chart illustrating the details of the image request response process at S112 shown in FIG. 3. The system control circuit 50 continues a connection detection to the packet network 700 including a base portable phone station during a predetermined time by using an unrepresented detection function via the communication unit 110 which is a wireless communication I/F such as a portable phone (S501, S502). If a connection to the packet network 700 is not detected in the predetermined time, it is regarded as time-out (S502) and the image request response process routine S112 is terminated.

If a connection to the packet network 700 is detected (S501), the communication function including the communication unit 110 is initialized (S503).

Next, the system control circuit 50 judges whether one or a plurality of information processing apparatuses (client computer 500) issue a notice of a command or the like via the network 604 and the like, Internet 600, network 602, image managing apparatus (image gateway) 400, network 702, and packet network 700 (S504). If there is no notice of a command or the like (S504), the flow advances to S512. If there is a notice of a command or the like (S504), the system control circuit 50 authenticates and identifies the information processing apparatus or the like which transmitted a command or the like (S505). If it is judged that receiving the notified command or the like poses some problem (S506), the flow skips to S512, whereas if it is judged that receiving the notified command or the like poses no problem (S506), the flow advances to S507.

The information processing apparatus transmitted a command or the like can be authenticated and identified by referring to the identification management information of data stored in a predetermined field of the image pickup apparatus 100, and/or the identification management information in the recording medium 200 or 210, and/or the identification management information stored in the image managing apparatus (image gateway) 400. If the identification management information stored in the image managing apparatus (image gateway) 400 is used, the system control circuit 50 requests necessary identification information from the image managing apparatus (image gateway) 400 via the packet network 700 and network 702, and after authentication, can acquire necessary identification information.

The system control circuit 50 receives a command or the like notified from the information processing apparatus (S507). If the judgement results of the contents of the received command or the like indicate that the command or the like is a transmission request command for requesting one or a plurality of images (S508), it is checked whether the image corresponding to the request is stored in a predetermined field of the image pickup apparatus 100, and/or the recording medium 200, and/or the recording medium 210 (S509). If the command or the like is not the image request command (S508), the flow skips to S512.

The image information apparatus determines a transmission request image from the public information list of indices or the like including a thumbnail, the list being acquired by browsing the image managing apparatus (image gateway) 400 through the network open setting at Step S111. If the image corresponding to the request is not stored (S509), the flow skips to S512, whereas if the image corresponding to the request is stored (S509), the flow advances to S510.

Next, the system control circuit 50 requests the power control unit 80 to judge whether the remaining capacity and operation status of the power unit 86 poses any problem of the image transmission operation by the image pickup apparatus 100 (S510), and if there is any problem, the flow advances to S512. If there is no problem of the image transmission operation by the image pickup apparatus 100 (S510), data of one or a plurality of images requested by the information processing apparatus is transmitted to the information processing apparatus (S511) to thereafter advance to S512.

The system control circuit 50 checks whether a communication connection state to the packet network 700 via the communication unit 110 is disconnected (S512). If the communication connection state to the packet network 700 is not disconnected (S512), the flow returns to S504. If the communication state to the packet network 700 is disconnected (S512), the system control circuit 50 performs a predetermined communication end process relative to the communication function including the communication unit 110 which is a wireless communication I/F such as a portable phone (S513), and thereafter terminates the image request response process routine S112.

As described above, according to the image request response process routine S112, in response to an image transmission request from an information processing apparatus, the image pickup apparatus can transmit the requested image to the information processing apparatus. In this case, the information processing apparatus refers to the public information of registered open images of the image pickup apparatus publicized on the Internet and registered in the image managing apparatus, and directly issues the request to the image pickup apparatus. Efficient information transfer is therefore possible.

Figure 8:
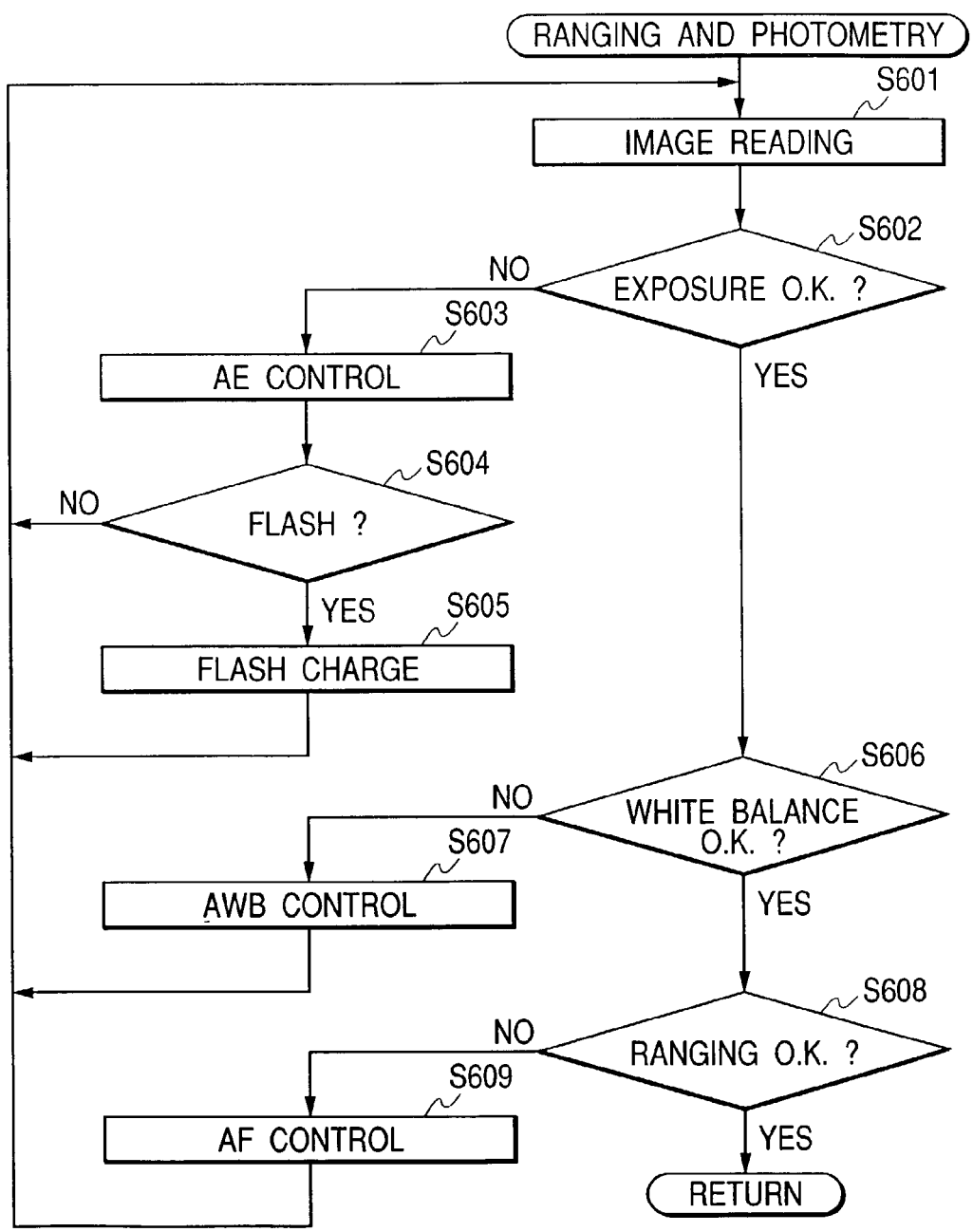
FIG. 8 is a flow chart illustrating a ranging and photometry process of the image pickup apparatus.

FIG. 8 is a flow chart illustrating the details of the ranging and photometry process at S206 shown in FIG. 4. In the ranging and photometry process, a charge signal is read from the image pickup device 14 to sequentially supply photographed image data to the image processing circuit 20 via the A/D converter 16 (S601). By using the sequentially supplied image data, the image processing circuit 20 performs predetermined calculations for an auto focus (AF) process, an auto exposure (AE) process and an electronic flash pre-emission (EF) process, respectively of a through-the-lens (TTL) type. In each process, calculations are made by picking up necessary pixel areas among all pixels of a photographed image. An optimum calculation for different modes such as a center emphasis mode, an average mode and an evaluation mode can therefore be made for each of AE, EF, AWB and AF of the TTL type.

By using the calculation results by the image processing circuit 20, the system control circuit 50 makes the exposure control unit 40 execute an AE control (S603) until the exposure (AE) is judged proper (S602).

By using the measurement data obtained by the AE control, the system control circuit 50 judges whether the flash is necessary (S604). If the flash is necessary, a flash flag is set to charge the flash unit 48 (S605). If it is judged that the exposure (AE) is proper (S602), the measurement data and/or setting parameters are stored in an internal memory of the system control circuit 50 or in the memory 52.

By using the calculation results by the image processing circuit 20 and the measurement data obtained by the AE control, the system control circuit 50 makes the image processing circuit 20 execute a white balance (AWB) control by adjusting the color parameters (S607) until the AWB is judged as proper (S606). If the white balance (AWB) is judged as proper (S606), the measurement data and/or setting parameters are stored in the internal memory of the system control circuit 50 or in the memory 52.

By using the measurement data obtained by the AE control and AWB control, the system control circuit 50 makes the ranging control unit 42 execute the AF control (S609) until the ranging (AF) is judged as in-focus (S608). If the ranging (AF) is judged as in-focus (S608), the measurement data and/or setting parameters are stored in the internal memory of the system control circuit 50 or in the memory 52 to thereafter terminate the ranging and photometry process routine S206.

Figure 9:
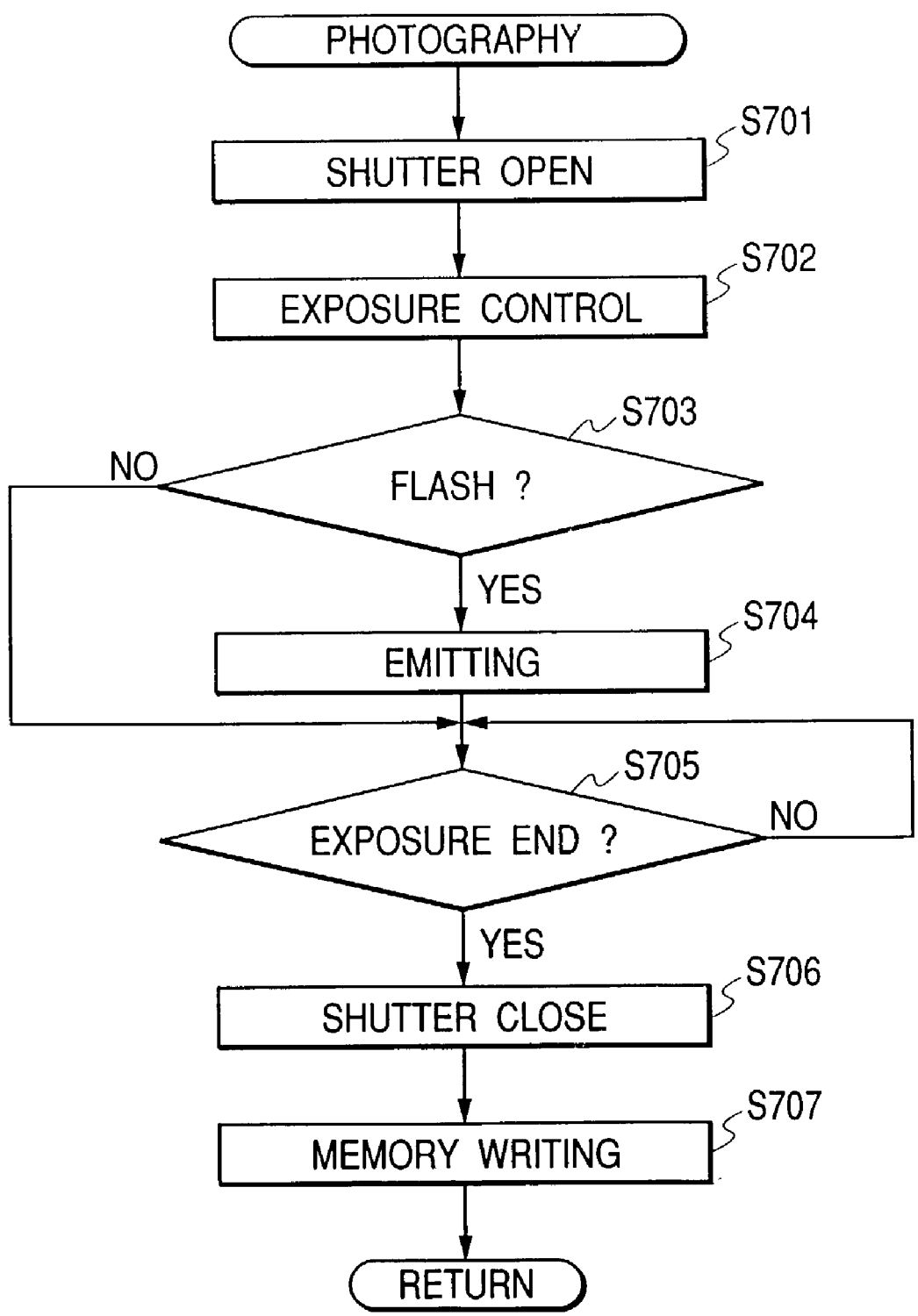
FIG. 9 is a flow chart illustrating a photography process of the image pickup apparatus.

FIG. 9 is a flow chart illustrating the details of the photography process at S209 shown in FIG. 4. In the photography process routine, in accordance with the photometry data stored in the internal memory of the system control circuit 50 or in the memory 52, the exposure control unit 40 opens the shutter 12 having the aperture function in accordance with the aperture value to expose the image pickup device 10 (S701, S702).

It is judged from the flash flag whether the flash unit 48 is necessary (S703). If necessary, the flash is driven to emit light (S704).

Next, in accordance with the photometry data, an exposure end of the image pickup device 12 is awaited (S705), then the shutter 12 is closed (S706). A charge signal is read from the image pickup device 14 to write photographed image data in the memory 30 via the A/D converter 16, image processing circuit 20 and memory control circuit 22, or directly from the memory control circuit 22 via the A/D converter 16 (S707). After a series of processes is completed, the photography process routine S209 is terminated.

(Description of Operation of Image Gateway (Image Managing Apparatus) 400)

Figure 11:
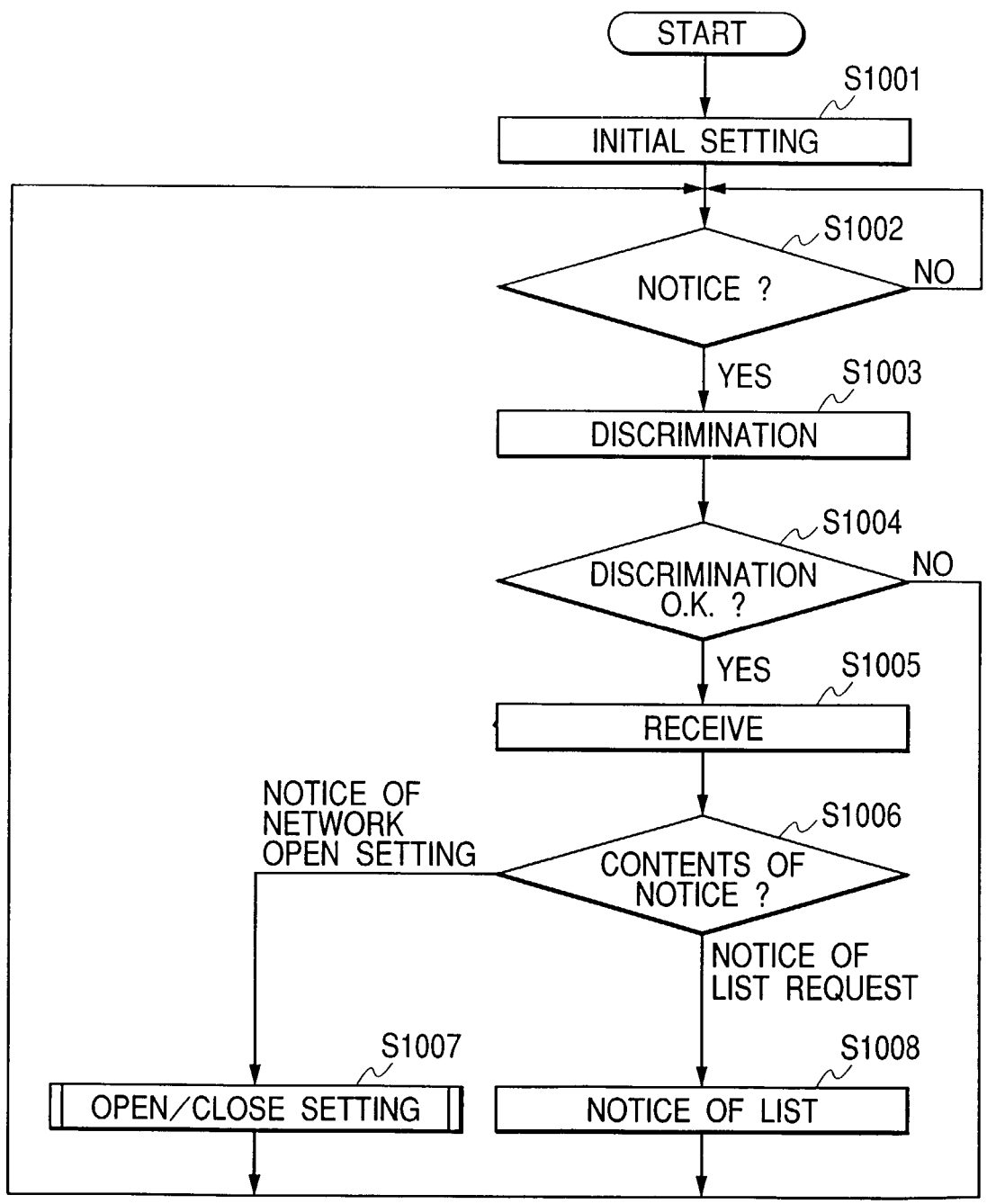
FIG. 11 is a flow chart illustrating the main operation of the image managing apparatus.

FIG. 11 is a flow chart illustrating the operation of the image managing apparatus of the invention. With reference to FIG. 11, the operation of the image managing apparatus of the invention will be described.

Upon turn-on of the power of the image managing apparatus, the control unit 402 initializes flags, registers, control variables and the like, reads control programs such as an operating system stored in a partial field of a hard disk in the hard disk drive 426 into DRAM 410 via the low speed bus 424, bus bridge 422, high speed bus 412 and bus bridge 408 with the memory controller function, and reads the control programs once in the cache memory 406 in the unit of a predetermined amount via the bus bridge 408 with the memory controller function to thereafter execute the control programs. The control unit 402 initializes each block of the image managing apparatus (S1001).

The control unit 402 checks whether the information storing apparatus such as the image pickup apparatus 100 issues a notice of a command or the like via the packet network 700, network 702 and network unit, 414, or whether the information processing apparatus (client computer 500) or the like issues a notice of a command or the like via the network 604 and the like, Internet 600, network 602 and network unit 416 (S1002).

If it is judged at S1002 that there is a notice of a command or the like, the control unit 402 authenticates and identifies the image pickup apparatus 100, information processing apparatus 500 or the like that transmitted the command or the like (S1003). If it is judged from the identification results that receiving the notified command or the like poses some problem (S1004), the flow returns to S1002.

If it is judged from the identification results that receiving the notified command or the like poses no problem (S1004), the flow advances to S1005. Authentication and identification of the image pickup apparatus 100, information processing apparatus 500 or the like that transmitted the command or the like can be made by using the identification management information stored in a hard disk of the hard disk drive 426 of the image managing apparatus (image gateway) 400.

The control unit 402 receives the command or the like notified from the image pickup apparatus 100, information processing apparatus 500 or the like (S1005) and judges the contents of the received command or the like (S1006).

If the judgement results of the contents of the received command or the like indicate that the command or the like is a command of notifying network open setting from the image pickup apparatus 100 (S1006), an open/close setting process is executed to rewrite the public information in accordance with the notified command and store a notified thumbnail and the like in a hard disk of the hard disk drive 426 (S1007). After the process is completed, the flow returns to S1002.

In the open/close setting process routine S1007, in accordance with a notice from the information storing apparatus such as the image pickup apparatus 100, a setting change of the public information of images stored in the image managing apparatus and publicized on the Internet, a change to the open setting for making all registered images open, a change to the close setting for making all registered images close, and addition/deletion of an image are performed. The details thereof will be later give with reference to FIG. 12.

If the judgement results of the contents of the command or the like received at S1005 indicate that the command or the like is a list request notice command from the information processing apparatus 500 or the like (S1006), a list of registered images of the image pickup apparatus 100 publicized on the Internet along with information (such as an IP address) of the image pickup apparatus is read from the public information stored in a predetermined field of a hard disk in the hard disk drive 426, and notified to the requested information processing apparatus or the like via the network unit 416, network 602, Internet 600, network 604 and the like (S1008) to thereafter return to S1002.

As described above, in response to a request from the information processing apparatus (such as the client computer 500), the management information of registered open images of the information storage apparatus (such as the image pickup apparatus 100) publicized on the Internet can be distributed.

Figure 12:
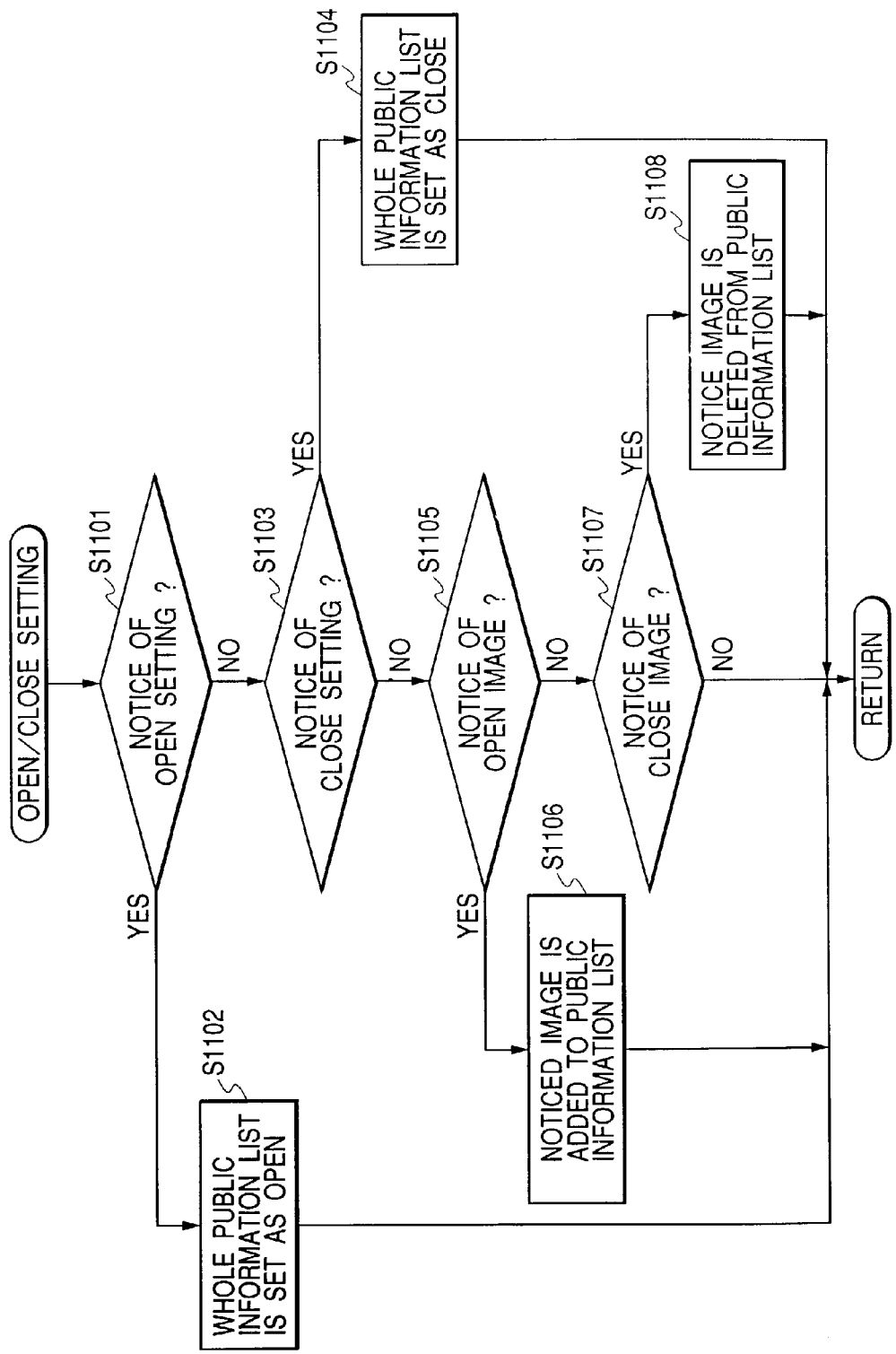
FIG. 12 is a flow chart illustrating an open/close setting process of the image managing apparatus.

FIG. 12 is a flow chart illustrating the details of the open/close setting process at S1007 shown in FIG. 11. If it is judged at Step S1005 that the command received from the image pickup apparatus 100 via the packet network 700, network 702, and network unit 414 is an open setting notice (S1101), the control unit 402 changes setting to the setting of publicizing the whole public information of the list of registered open images of the image pickup apparatus 100 stored in a predetermined field of a hard disk of the hard disk drive 426 (S1102) to thereafter terminate the open/close setting process routine S1007.

If it is judged at Step S1005 that the command received from the image pickup apparatus 100 via the packet network 700, network 702, and network unit 414 is a close setting notice (S1103), the control unit 402 changes setting to the setting of not publicizing the whole public information of the list of registered open images of the image pickup apparatus 100 stored in the predetermined field of a hard disk of the hard disk drive 426 (S1104) to thereafter terminate the open/close setting process routine S1007.

If it is judged at Step S1005 that the command received from the image pickup apparatus 100 via the packet network 700, network 702, and network unit 414 is an open image addition notice (S1105), management information of the noticed image is added to the public information of the list of registered open images of the image pickup apparatus 100 stored in the predetermined field of a hard disk of the hard disk drive 426 (S1106) to thereafter terminate the open/close setting process routine S1007. If an image to be added is an image to be newly registered, indices including a thumbnail and the like of the received image as well as the notified command is stored in a hard disk of the hard disk drive 426, and the management information of the notified image is added to the public information to complete the registration.

If it is judged at Step S1005 that the command received from the image pickup apparatus 100 via the packet network 700, network 702, and network unit 414 is a close image addition notice (S1107), management information of the close image indicated by the noticed command is deleted from the public information of the list of registered open images of the image pickup apparatus 100 stored in the predetermined field of a hard disk of the hard disk drive 426 (S1108) to thereafter terminate the open/close setting process routine S1007. When the management in-formation of the close image is deleted, the related thumbnail and the like may be deleted from the hard disk of the hard disk drive 426.

As described above, according to the open/close setting process routine S1007, in response to a notice from the information storage apparatus (such as the image pickup apparatus 100), the setting can be changed for the public information of registered images of the information storage apparatus publicized on the Internet and stored in the image managing apparatus. A change to the open setting for opening all registered images, a change to the close setting for closing all registered images, and addition/deletion of an image are also possible.

(Description of Operation of Client Computer (Information Processing Apparatus) 500)

Figure 14:
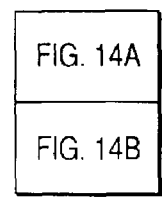
FIG. 14 composed of FIGS. 14A and 14B, is a flow chart illustrating the main operation of the information processing apparatus.
Figure 14A:
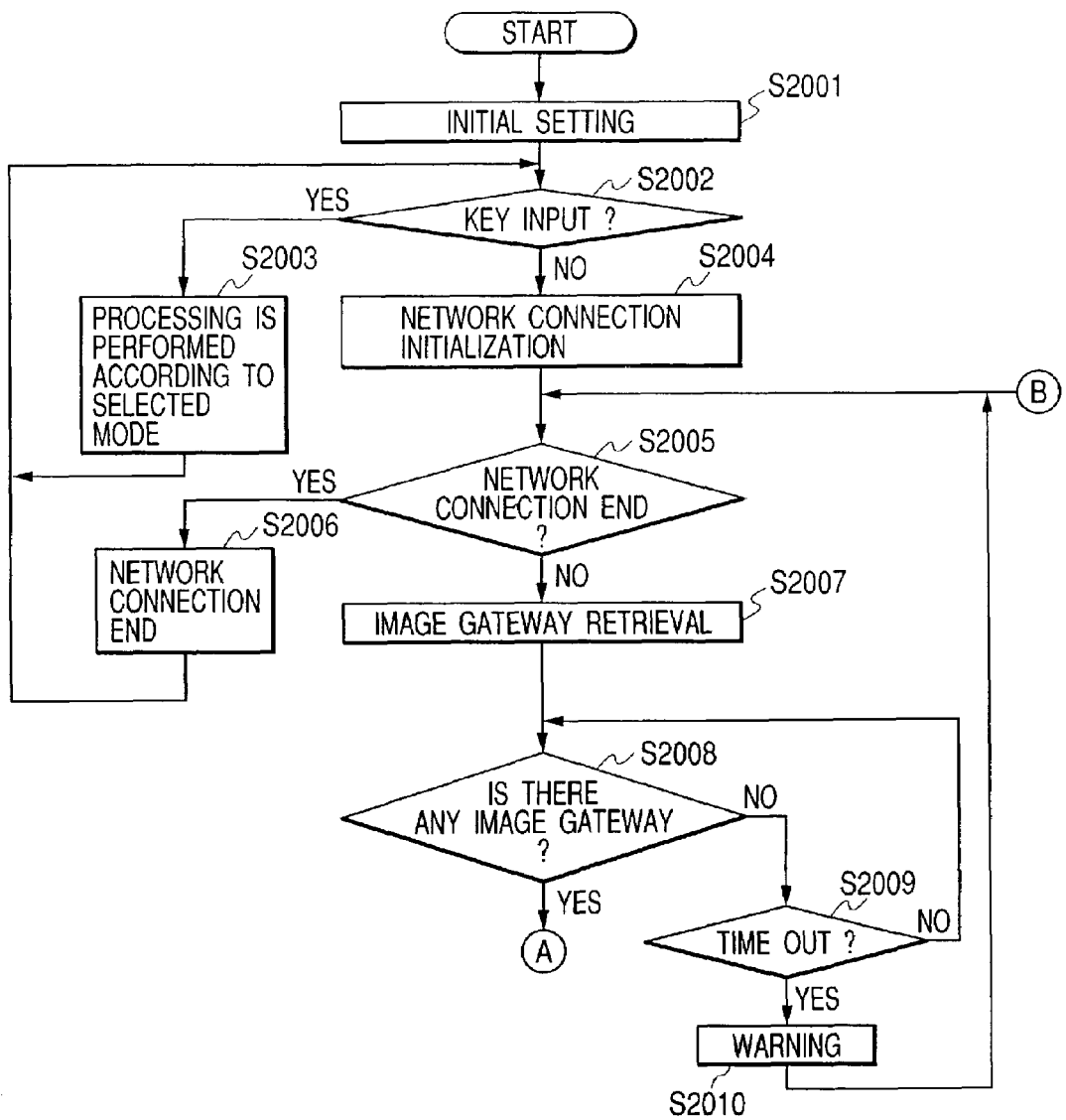
Figure 14B:
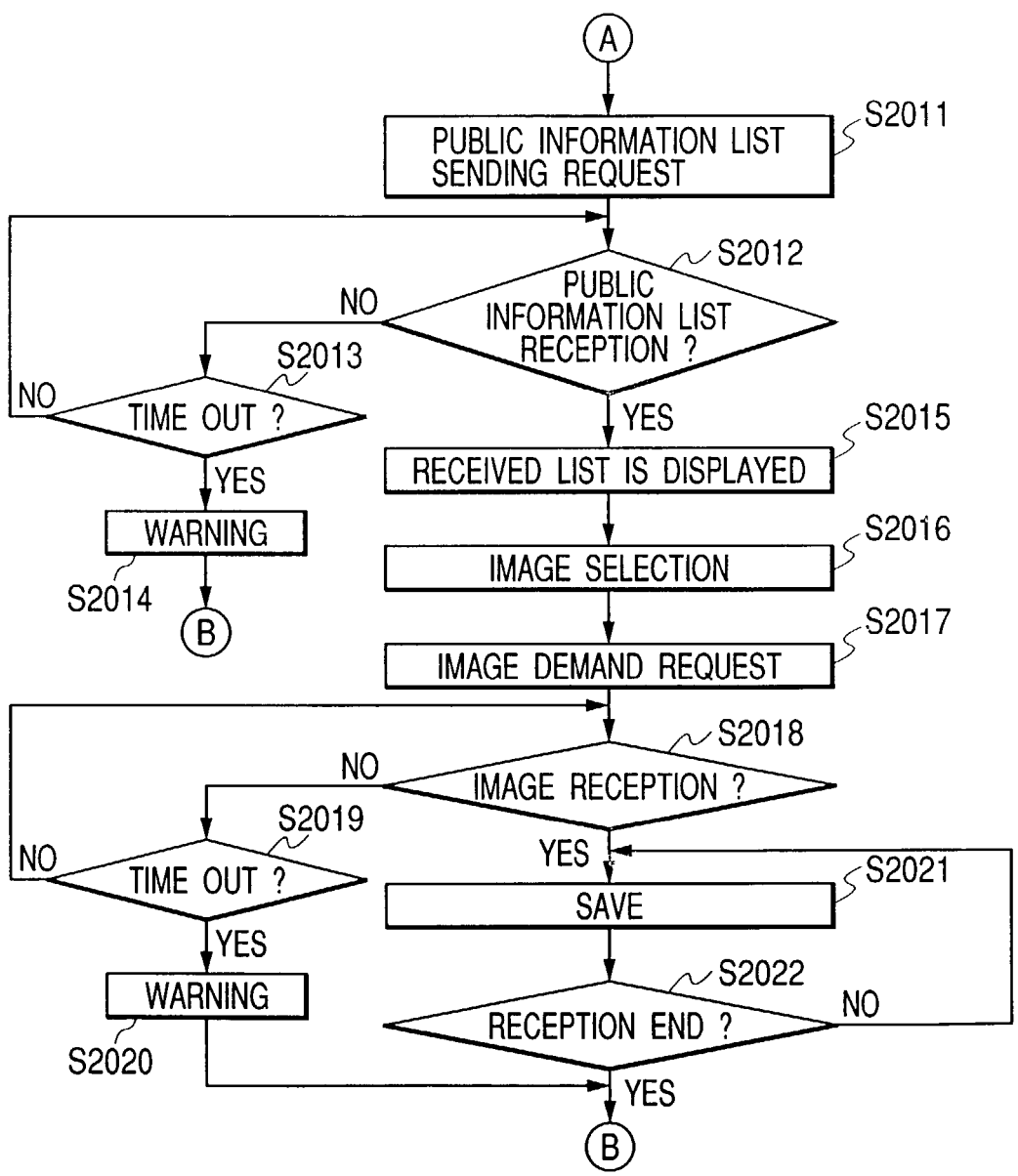

FIGS. 14A and 14B are flow charts illustrating the operation of the information processing apparatus 500. With reference to FIGS. 14A and 14B, the operation of the information processing apparatus of the invention will be described.

Upon turn-on of the power of the information processing apparatus, the control unit 502 initializes flags, registers, control variables and the like, reads control programs such as an operating system stored in a partial field of a hard disk in the hard disk drive 526 into DRAM 510 via the low speed bus 524, bus bridge 522, high speed bus 512 and bus bridge 508 with the memory controller function, and reads the control programs once in the cache memory 506 in the unit of a predetermined amount via the bus bridge 508 with the memory controller function to thereafter execute the control programs. The control unit 502 initializes each block of the information processing apparatus (S2001).

In response to an input by the key, touch panel, digitizer or the like of the operation unit 528 (S2002), the control unit 502 performs various processes corresponding to a selected mode (S2003) to thereafter return to S2002.

After the processes corresponding to the selected mode are performed, the control unit 502 initializes the network unit 514 and the communication function including a network processing program (S2004).

Next, the control unit 502 checks whether a communication connection state to the information storage apparatus (image pickup apparatus 100) via the network unit 514, network 604, Internet 600, network 602, image managing apparatus (image gateway) 400, network 702 and packet network 700 is disconnected or whether a communication connection state to the image managing apparatus 400 via the network unit 514, network 604, Internet 600 and network 602 is disconnected (S2005).

If the communication connection state to the image pickup apparatus 100 and/or image managing apparatus 400 is not disconnected (S2005), the flow advances to S2007. If the communication connection state to the image pickup apparatus 100 and/or image managing apparatus 400 is disconnected (S2005), the control unit 502 performs a predetermined communication end process for the network unit 514 and the communication function including a network processing program (S2006) to thereafter return to S2002.

The control unit 502 searches via the network unit 514, network 604 and Internet 600 the image managing apparatus 400 or the like (S2007). If the image managing apparatus 400 or the like connected to the Internet 600 is found (S2008), the flow advances to S2011. If the image managing apparatus 400 or the like connected to the Internet 600 is not found even if the search is performed during a predetermined time (S2008, S2009), the display unit 520 displays a predetermined alarm by using images or voices (S2010) to thereafter return to S2005.

The control unit 502 requests the image managing apparatus 400 to transmit the public information list of the image pickup apparatus 100 (S2011) and stands by until the public information list is transmitted from the image managing apparatus 400 (S2012). If the public information list is not received even if the predetermined time lapses (S2012, S2013), the control unit 502 makes the display unit 520 display a predetermined alarm by using images or voices (S2014) to thereafter return to S2005.

If the public information list is received from the image managing apparatus 400 via the network 602, Internet 600 and network 604 (S2012), the control unit 502 makes the display unit 520 display the received list, an index of each image and a thumbnail image (S2015).

A list of the public information of registered open images of the image pickup apparatus 100 publicized on the Internet and registered in the image managing apparatus can be acquired from the image managing apparatus 400.

If one or a plurality of images to be requested from the image pickup apparatus 100 are selected in response to an input by the key, and/or switch, and/or dial and/or the like of the operation unit 528 in accordance with the contents of the list displayed on the display unit 520 (S2016), information (such as an IP address) of the image pickup apparatus storing the subject image (group) is inquired from the image managing apparatus 400 via the network unit 514, network 604 and Internet 600, the information is authenticated and received, and an image transmission request command is notified to the image pickup apparatus 100 via the image managing apparatus 400, network 702 and packet network 700 (S2017). The control unit 502 stands by until the image pickup apparatus 100 transmits one or a plurality of images in response to the image request command notice (S2018).

If the request image is not received from the image pickup apparatus 100 even after a predetermined time lapses, it is regarded as time-out (S2018, S2019) and the display unit 520 displays a predetermined alarm by using images or voices (S2020) to thereafter return to S2005.

If the requested image is transmitted from the image pickup apparatus 100 in response to the image request command notice and can be received (S2018), data of one or a plurality of images transmitted via the packet network 700, network 702, image managing apparatus (image gateway) 400, network 602, Internet 600, network 604 and network unit 514 is stored in a hard disk of the hard disk drive 526 (S2021). A series of reception operations is repeated until all images are received (S2022).

As described above, a user of the client computer refers to the public information of registered open images of the information storage apparatus (image pickup apparatus 100) publicized on the Internet and registered in the image managing apparatus, selects an image and issues the transmission request, so that a desired image can be acquired from the information storage apparatus (image pickup apparatus 100).

The embodiment of the invention has been described with reference to FIGS. 1 to 14A and 14B.

In the embodiment, one image pickup apparatus 100, one image managing apparatus (image gateway) 400 and one information processing apparatus (client computer) 500 are used. Instead, any combination of one or a plurality of image pickup apparatuses 100, one or a plurality of image managing apparatuses (image gateways) 400, and one or a plurality of information processing apparatuses (client computers) 500 may be used.

One or a plurality of packet networks 700 including base portable phone stations may be used.

Although an integration of the image pickup function part and a communication function part including the communication unit 110 with the portable phone function is used as the image pickup apparatus 100, discrete image pickup function part and communication function part may be used. In this case, the image pickup function part and communication function part are made capable of communicating each other by interface of wired communication such as USB or wireless communication such as Bluetooth.

It is obvious that the recording media 200 and 210 are not limited only to a memory card such as a PCMCIA card and a compact flash memory, a hard disk or the like, but a micro DAT, a magneto optical disk, an optical disk such as CD-R and a CD-WR, a phase change type optical disk such as a DVD, or the like may also be used.

It is obvious that the recording media 200 and 210 may be a composite medium of an integration of a memory card, a hard disk and the like. Some medium may be removable from the composite medium.

In the description of the embodiment, the recording media 200 and 210 are separated from the image pickup apparatus 100 and connected as desired. It is obvious that some or all of the recording media may be fixed to the image pickup apparatus 100.

One or a plurality of recording media 200 and one or a plurality of recording media 210 may be connected to the image pickup apparatus 100. Although the recording media 200 and 210 are mounted on the image pickup apparatus 100, any combination of one or a plurality of recording media 200 and one or a plurality of recording media 210 may be used.

As described so far, according to the embodiment of the invention, by operating upon a user interface of the information storage apparatus, setting of the public information (management information) of registered open images of the information storage apparatus publicized on the Internet and registered in the image managing apparatus can be changed so that registered open images can be made either open or close as desired.

A change to open setting for opening all registered images, a change to close setting for closing all registered images, addition/deletion of an image are possible.

The information processing apparatus can refer to the public information (management information) of registered open images of the information storage apparatus publicized on the Internet and registered in the image managing apparatus.

As the information processing apparatus refers to the public information (management information) of registered open images of the information storage apparatus publicized on the Internet and registered in the image managing apparatus, the information processing apparatus can transmit a transmission request of a desired image to the information storage apparatus. In response to the transmission request, the information storage apparatus can transmit the requested image to the information processing apparatus.

According to the invention, therefore, if a photographed image is to be publicized on the Internet, it is not necessary that the information processing apparatus such as an image pickup apparatus transmits and stores (uploads) the photographed image data to and in the image managing apparatus. A work of uploading is unnecessary. Spiritual stress of utilizing the image managing apparatus (server) having a limited recording capacity can be relaxed.

By using the image managing system of the invention, it is not necessary that the information storage apparatus such as an image pickup apparatus transmits and stores the open image data itself to the image managing system. Therefore, time and transmission cost required for transmitting images of a large data to a number of image managing apparatuses (servers) can be reduced.

If a portable apparatus such as an image pickup apparatus is used as the information storage apparatus, setting/release of an image to be publicized on the Internet can be performed by the operation unit of the image pickup apparatus or the like so that it is easy to perform such operations. Since another PC or the like is not necessary, complicated knowledge of operations are not necessary and it is economical.

The image pickup apparatus or the like manages photographed images themselves in the apparatus. Accordingly, irrespective of the setting state of the image managing apparatus, the image pickup apparatus can open or close each image by itself. For example, even if an image stored in the recording medium 200 or 210 is set open, the recording medium 200 or 210 can be physically removed from the image pickup apparatus 100 to protect it by taking security of image data into consideration.

OTHER EMBODIMENTS

The scope of the invention contains also the case wherein a recording medium storing software program codes realizing the function of the embodiment described above is supplied to a system or an apparatus and a computer (or CPU or MPU) of the system or apparatus reads and executes the program codes stored in the recording medium.

In this case, the software program codes themselves read from the recording medium realize the embodiment function. Therefore, the recording medium storing the program codes constitutes the present invention.

The storage medium for storing such program codes may be a floppy disk, a hard disk, an optical disk, a magneto optical disk, a CD-ROM, a CD-R, a magnetic tape, a nonvolatile memory card, a ROM or the like.

It is obvious that not only the embodiment function can be realized by executing the program codes read by a computer, but also the embodiment function can be realized by performing a portion or the whole of the actual processes by an OS (operating system) running on the computer in accordance with the program codes.

It is obvious that the embodiment function can be realized by writing the program codes read from the recording medium into a memory of a function expansion board inserted into a computer or of a function expansion unit connected to the computer, and thereafter by executing a portion or the whole of actual processes by a CPU of the function expansion board or function expansion unit.

As above, the invention can be embodied by software processes using the program codes so that the amount of hardware can be reduced.

As described so far, according to the invention, information browsing and transfer between apparatuses connected to the network can be performed very easily. Network traffics of data transfer can be relaxed and a communication cost can be lowered.

What is claimed is:

1. An image distribution system including an image pickup apparatus, a server apparatus and an information processing apparatus, said server apparatus comprising:

storing means for storing a plurality of thumbnail images uploaded from said image pickup apparatus; and list transmitting means for transmitting an image publication list including the thumbnail images uploaded from said image pickup apparatus and an address thereof, to said information processing apparatus on the basis of a publication and non-publication setting notified by said image pickup apparatus, said information processing apparatus comprising:

selecting means for selecting desired one of the thumbnail images included in the image publication list transmitted from said server apparatus; and initiating means for initiating communication with said image pickup apparatus on the basis of the address of said image pickup apparatus corresponding to the thumbnail image selected by said selecting means, and said image pickup apparatus comprising:

request receiving means for receiving a request of an original image of the thumbnail image from said information processing apparatus through the communication initiated by said initiating means; and image transmitting means for transmitting the original image directly to said information processing apparatus on the basis of the request received therefrom.

2. A system according to claim 1, wherein said image pickup apparatus can communicate with said server apparatus or said information processing apparatus via a wireless communication network.

* * * * *

UNITED STATES PATENT AND TRADEMARK OFFICE
CERTIFICATE OF CORRECTION

PATENT NO. : 7,272,641 B2  Page 1 of 1
APPLICATION NO. : 10/185023
DATED : September 18, 2007
INVENTOR(S) : Yoichi Yamagishi It is certified that error appears in the above-identified patent and that said Letters Patent is hereby corrected as shown below:

Column 18, line 17, delete "in-formation" and insert -- information --

Signed and Sealed this

Second Day of September, 2008

JON W. DUDAS
*Director of the United States Patent and Trademark Office*